(12) United States Patent
Jones et al.

(10) Patent No.: US 9,554,247 B2
(45) Date of Patent: *Jan. 24, 2017

(54) TECHNIQUES FOR COMPUTING LOCATION OF A MOBILE DEVICE BASED ON OBSERVED WI-FI ACCESS POINTS

(71) Applicant: Skyhook Wireless, Inc., Boston, MA (US)

(72) Inventors: Russel K. Jones, Roswell, GA (US); Farshid Alizadeh-Shabdiz, Wayland, MA (US); Edward J. Morgan, Needham, MA (US); Michael G. Shean, Boston, MA (US)

(73) Assignee: Skyhook Wireless, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/181,057

(22) Filed: Jun. 13, 2016

(65) Prior Publication Data

US 2016/0295360 A1    Oct. 6, 2016

Related U.S. Application Data

(63) Continuation of application No. 14/456,310, filed on Aug. 11, 2014, now Pat. No. 9,369,884, which is a
(Continued)

(51) Int. Cl.
*H04W 24/00* (2009.01)
*H04W 4/02* (2009.01)
(Continued)

(52) U.S. Cl.
CPC .............. *H04W 4/02* (2013.01); *G01S 5/0242* (2013.01); *G01S 5/0252* (2013.01); *G01S 19/46* (2013.01); *H04W 48/16* (2013.01); *H04W 88/08* (2013.01)

(58) Field of Classification Search
CPC ...... H04W 88/08; H04W 88/06; H04W 88/04; H04W 88/10; H04W 64/00; H04W 4/021; H04W 4/025; H04W 48/20; H04W 84/12; H04W 48/18; H04W 12/00; H04W 36/08; H04W 36/14; H04W 72/02; H04W 92/10; G01S 19/48; G01S 5/0242; G01S 5/14; G01S 5/0036; G01S 5/0063; H04L 12/66; H04L 67/16; H04L 12/5692; H04L 43/0811; H04M 2242/30; H04M 1/72572; G06F 21/00; G06F 21/31
See application file for complete search history.

(56) References Cited

U.S. PATENT DOCUMENTS 3,881,060 A    4/1975   Connell et al.
4,310,726 A    1/1982   Asmuth
(Continued)

FOREIGN PATENT DOCUMENTS

CA    2056203    7/1992
EP    493896     8/1992
(Continued)

OTHER PUBLICATIONS

Adelstein, Frank, et al., "Physically Locating Wireless Intruders," Journal of Universal Computer Science, vol. 11, No. 1, Jan. 28, 2005, pp. 1-16.
(Continued)

*Primary Examiner* — Nimesh Patel
(74) *Attorney, Agent, or Firm* — Cesari and McKenna, LLP; James A. Blanchette

(57) ABSTRACT

In one embodiment, scanning data is received for wireless access points whose wireless signals were observed by the one or more scanning devices in a target area. For each group of scanning data that shares a common identifier of a Wi-Fi access point, a centroid of the scanning data is determined, a set of scanning data of the group that exceeds
(Continued)

a threshold distance from the centroid is designated as having potential error, and a location of the Wi-Fi access point is calculated. The calculated location of the Wi-Fi access point for each group of scanning data is stored in a reference database. Upon receiving a request for a location of a mobile device, an identity of one or more Wi-Fi access points in range of the mobile device is determined, and the location of the mobile device is computed using calculated locations from the reference database.

20 Claims, 11 Drawing Sheets

Related U.S. Application Data continuation of application No. 13/225,848, filed on Sep. 6, 2011, now Pat. No. 8,837,363, which is a continuation of application No. 12/190,683, filed on Aug. 13, 2008, now Pat. No. 8,031,657, which is a continuation of application No. 11/261,898, filed on Oct. 28, 2005, now Pat. No. 7,414,988.

(60) Provisional application No. 60/623,108, filed on Oct. 29, 2004.

(51) Int. Cl.
H04W 48/16 (2009.01)
G01S 5/02 (2010.01)
G01S 19/46 (2010.01)
H04W 88/08 (2009.01)

(56) References Cited

U.S. PATENT DOCUMENTS

| | | |
|---|---|---|
| 4,415,771 A | 11/1983 | Martinez |
| 4,757,267 A | 7/1988 | Riskin |
| 4,924,491 A | 5/1990 | Compton et al. |
| 4,991,176 A | 2/1991 | Dahbura et al. |
| 5,043,736 A | 8/1991 | Darnell et al. |
| 5,095,505 A | 3/1992 | Finucane et al. |
| 5,119,504 A | 6/1992 | Durboraw, III |
| 5,136,636 A | 8/1992 | Wegrznowicz |
| 5,161,180 A | 11/1992 | Chavous |
| 5,235,630 A | 8/1993 | Moody et al. |
| 5,235,633 A | 8/1993 | Dennison et al. |
| 5,315,636 A | 5/1994 | Patel |
| 5,334,974 A | 8/1994 | Simms et al. |
| 5,353,023 A | 10/1994 | Mitsugi |
| 5,379,337 A | 1/1995 | Castillo et al. |
| 5,389,935 A | 2/1995 | Drouault et al. |
| 5,414,432 A | 5/1995 | Penny, Jr. et al. |
| 5,564,121 A | 10/1996 | Chow et al. |
| 5,940,825 A | 8/1999 | Castelli et al. |
| 5,946,615 A | 8/1999 | Holmes et al. |
| 6,134,448 A | 10/2000 | Shoji et al. |
| 6,192,312 B1 | 2/2001 | Hummelsheim |
| 6,262,741 B1 | 7/2001 | Davies |
| 6,272,405 B1 | 8/2001 | Kubota et al. |
| 6,438,491 B1 | 8/2002 | Farmer |
| 6,484,034 B1 | 11/2002 | Tsunehara et al. |
| 6,625,647 B1 | 9/2003 | Barrick, Jr. et al. |
| 6,664,925 B1 | 12/2003 | Moore et al. |
| 6,665,658 B1 | 12/2003 | DaCosta et al. |
| 6,674,403 B2 | 1/2004 | Gray et al. |
| 6,678,611 B2 | 1/2004 | Khavakh et al. |
| 6,741,188 B1 | 5/2004 | Miller et al. |
| 6,754,488 B1 | 6/2004 | Won et al. |
| 6,799,049 B1 | 9/2004 | Zellner et al. |
| 6,862,524 B1 | 3/2005 | Naada et al. |
| 6,888,811 B2 | 5/2005 | Eaton et al. |
| 6,915,128 B1 | 7/2005 | Oh |
| 6,956,527 B2 | 10/2005 | Rogers et al. |
| 6,978,023 B2 | 12/2005 | Dacosta |
| 6,990,351 B2 | 1/2006 | Tsunehara et al. |
| 6,990,428 B1 | 1/2006 | Kaiser et al. |
| 7,042,391 B2 | 5/2006 | Meunier et al. |
| 7,086,089 B2 | 8/2006 | Hrastar et al. |
| 7,116,988 B2 | 10/2006 | Dietrich et al. |
| 7,120,449 B1 | 10/2006 | Muhonen et al. |
| 7,123,928 B2 | 10/2006 | Moeglein et al. |
| 7,130,642 B2 | 10/2006 | Lin |
| 7,130,646 B2 | 10/2006 | Wang |
| 7,155,239 B2 | 12/2006 | Zeng et al. |
| 7,167,715 B2 | 1/2007 | Stanforth |
| 7,167,716 B2 | 1/2007 | Kim |
| 7,197,556 B1 | 3/2007 | Short et al. |
| 7,206,294 B2 | 4/2007 | Garahi et al. |
| 7,242,950 B2 | 7/2007 | Suryanarayana et al. |
| 7,250,907 B2 | 7/2007 | Krumm et al. |
| 7,254,405 B2 | 8/2007 | Lin et al. |
| 7,257,411 B2 | 8/2007 | Gwon et al. |
| 7,271,765 B2 | 9/2007 | Stilp et al. |
| 7,277,404 B2 | 10/2007 | Tanzella et al. |
| 7,299,058 B2 | 11/2007 | Ogino |
| 7,305,245 B2 | 12/2007 | Alizadeh-Shabdiz et al. |
| 7,317,914 B2 | 1/2008 | Adya et al. |
| 7,319,878 B2 | 1/2008 | Sheynblat et al. |
| 7,323,991 B1 | 1/2008 | Eckert et al. |
| 7,373,154 B2 | 5/2008 | Sharony et al. |
| 7,389,114 B2 | 6/2008 | Ju et al. |
| 7,397,424 B2 | 7/2008 | Houri |
| 7,403,762 B2 | 7/2008 | Morgan et al. |
| 7,412,246 B2 | 8/2008 | Lewis et al. |
| 7,414,988 B2 | 8/2008 | Jones et al. |
| 7,417,961 B2 | 8/2008 | Lau |
| 7,426,197 B2 | 9/2008 | Schotten et al. |
| 7,433,673 B1 | 10/2008 | Everson et al. |
| 7,433,694 B2 | 10/2008 | Morgan et al. |
| 7,433,696 B2 | 10/2008 | Dietrich et al. |
| 7,440,755 B2 | 10/2008 | Balachandran et al. |
| 7,474,897 B2 | 1/2009 | Morgan et al. |
| 7,474,988 B2 | 1/2009 | Kamisuwa et al. |
| 7,493,127 B2 | 2/2009 | Morqan et al. |
| 7,502,620 B2 | 3/2009 | Morgan et al. |
| 7,519,372 B2 | 4/2009 | MacDonald et al. |
| 7,522,908 B2 | 4/2009 | Hrastar |
| 7,525,484 B2 | 4/2009 | Dupray et al. |
| 7,660,588 B2 | 2/2010 | Sheynblat et al. |
| 7,672,675 B2 | 3/2010 | Pande et al. |
| 7,764,231 B1 | 7/2010 | Karr et al. |
| 7,853,250 B2 | 12/2010 | Harvey et al. |
| 7,856,209 B1 | 12/2010 | Rawat |
| 8,031,657 B2 | 10/2011 | Jones et al. |
| 8,369,264 B2 | 2/2013 | Brachet et al. |
| 8,538,457 B2 | 9/2013 | Morgan et al. |
| 8,837,363 B2 | 9/2014 | Jones et al. |
| 2001/0053999 A1 | 12/2001 | Feinberg |
| 2002/0055956 A1 | 5/2002 | Krasnoiarov et al. |
| 2002/0173317 A1 | 11/2002 | Nykanen et al. |
| 2002/0184331 A1 | 12/2002 | Blight et al. |
| 2003/0008668 A1 | 1/2003 | Perez-Breva et al. |
| 2003/0028319 A1 | 2/2003 | Khavakh et al. |
| 2003/0043073 A1 | 3/2003 | Gray et al. |
| 2003/0069024 A1 | 4/2003 | Kennedy |
| 2003/0087647 A1 | 5/2003 | Hurst |
| 2003/0098811 A1 | 5/2003 | Nikolai et al. |
| 2003/0114206 A1 | 6/2003 | Timothy et al. |
| 2003/0125045 A1 | 7/2003 | Riley et al. |
| 2003/0146835 A1 | 8/2003 | Carter |
| 2003/0186679 A1 | 10/2003 | Challener |
| 2003/0225893 A1 | 12/2003 | Roese et al. |
| 2004/0019679 A1 | 1/2004 | E et al. |
| 2004/0039520 A1 | 2/2004 | Khavakh et al. |
| 2004/0058640 A1 | 3/2004 | Root et al. |
| 2004/0072577 A1 | 4/2004 | Myllymaki et al. |
| 2004/0081133 A1 | 4/2004 | Smavatkul et al. |
| 2004/0087317 A1 | 5/2004 | Caci |
| 2004/0102192 A1 | 5/2004 | Serceki |
| 2004/0124977 A1 | 7/2004 | Biffar |
| 2004/0157624 A1 | 8/2004 | Hrastar |
| 2004/0162896 A1 | 8/2004 | Cen et al. |

(56) References Cited

U.S. PATENT DOCUMENTS

| | | |
|---|---|---|
| 2004/0193367 A1 | 9/2004 | Cline |
| 2004/0203847 A1 | 10/2004 | Knauerhase et al. |
| 2004/0205234 A1 | 10/2004 | Barrack et al. |
| 2004/0248589 A1 | 12/2004 | Gwon et al. |
| 2004/0263388 A1 | 12/2004 | Krumm et al. |
| 2005/0020266 A1 | 1/2005 | Backes et al. |
| 2005/0021781 A1 | 1/2005 | Sunder et al. |
| 2005/0037775 A1 | 2/2005 | Moeglein et al. |
| 2005/0043040 A1 | 2/2005 | Contractor |
| 2005/0055374 A1 | 3/2005 | Sato |
| 2005/0105600 A1 | 5/2005 | Culum et al. |
| 2005/0108306 A1 | 5/2005 | Martizano Catalasan |
| 2005/0136845 A1 | 6/2005 | Masuoka et al. |
| 2005/0164710 A1 | 7/2005 | Beuck |
| 2005/0192024 A1 | 9/2005 | Sheynblat |
| 2005/0227711 A1 | 10/2005 | Orwant et al. |
| 2005/0232189 A1 | 10/2005 | Loushine |
| 2005/0251326 A1 | 11/2005 | Reeves |
| 2006/0002326 A1 | 1/2006 | Vesuna |
| 2006/0009235 A1 | 1/2006 | Sheynblat et al. |
| 2006/0040640 A1 | 2/2006 | Thompson et al. |
| 2006/0046709 A1 | 3/2006 | Krumm et al. |
| 2006/0058957 A1 | 3/2006 | Hickenlooper et al. |
| 2006/0058958 A1 | 3/2006 | Galbreath et al. |
| 2006/0061476 A1 | 3/2006 | Patil et al. |
| 2006/0078122 A1 | 4/2006 | Dacosta |
| 2006/0089157 A1 | 4/2006 | Casey et al. |
| 2006/0089160 A1 | 4/2006 | Othmer |
| 2006/0092015 A1 | 5/2006 | Aorawal et al. |
| 2006/0095348 A1 | 5/2006 | Jones et al. |
| 2006/0095349 A1 | 5/2006 | Morgan et al. |
| 2006/0106850 A1 | 5/2006 | Morqan et al. |
| 2006/0128397 A1 | 6/2006 | Choti et al. |
| 2006/0193258 A1 | 8/2006 | Ballai |
| 2006/0194568 A1 | 8/2006 | Sharony |
| 2006/0197704 A1 | 9/2006 | Luzzatto et al. |
| 2006/0200843 A1 | 9/2006 | Morgan et al. |
| 2006/0217131 A1 | 9/2006 | Alizadeh-Shabdiz et al. |
| 2006/0221918 A1 | 10/2006 | Wang |
| 2006/0240840 A1 | 10/2006 | Morgan et al. |
| 2006/0270421 A1 | 11/2006 | Phillips et al. |
| 2007/0004427 A1 | 1/2007 | Morgan et al. |
| 2007/0004428 A1 | 1/2007 | Morgan et al. |
| 2007/0077945 A1 | 4/2007 | Sheynblat |
| 2007/0097171 A1 | 5/2007 | Das et al. |
| 2007/0100955 A1 | 5/2007 | Bodner |
| 2007/0126635 A1 | 6/2007 | Houri |
| 2007/0178911 A1 | 8/2007 | Baumeister et al. |
| 2007/0184846 A1 | 8/2007 | Horton et al. |
| 2007/0210961 A1 | 9/2007 | Romijn |
| 2007/0232892 A1 | 10/2007 | Hirota |
| 2008/0004888 A1 | 1/2008 | Davis et al. |
| 2008/0045234 A1 | 2/2008 | Reed |
| 2008/0132170 A1 | 6/2008 | Alizadeh-Shabdiz et al. |
| 2008/0133124 A1 | 6/2008 | Sarkeshik |
| 2008/0133336 A1 | 6/2008 | Altman et al. |
| 2008/0139217 A1 | 6/2008 | Alizadeh-Shabdiz et al. |
| 2008/0139219 A1 | 6/2008 | Boeiro et al. |
| 2008/0176583 A1 | 7/2008 | Brachet et al. |
| 2009/0017841 A1 | 1/2009 | Lewis et al. |
| 2009/0075672 A1 | 3/2009 | Jones et al. |
| 2009/0149197 A1 | 6/2009 | Morgan et al. |
| 2011/0317579 A1 | 12/2011 | Jones et al. |
| 2014/0342752 A1 | 11/2014 | Jones et al. |

FOREIGN PATENT DOCUMENTS

| | | |
|---|---|---|
| EP | 1359714 | 11/2003 |
| JP | 03-235562 | 10/1991 |
| JP | 04-035345 | 2/1992 |
| JP | 02-107443 | 4/2002 |
| JP | 02-223218 | 8/2002 |
| JP | 2003-122655 | 4/2003 |
| JP | 03-198571 | 7/2003 |
| JP | 2003-244738 | 8/2003 |
| JP | 05-291793 | 10/2005 |
| JP | 2006-318274 | 11/2006 |
| JP | 2007-267346 | 10/2007 |
| JP | 2007-537614 | 12/2007 |
| WO | WO-03/021851 | 3/2003 |
| WO | WO-2004/002185 | 12/2003 |
| WO | WO-2005/004527 | 1/2005 |
| WO | WO-2006/043712 | 4/2006 |
| WO | WO-2006/096416 | 9/2006 |
| WO | WO-2006/110181 | 10/2006 |
| WO | WO-2007/081356 | 7/2007 |

OTHER PUBLICATIONS

Algorithms, "Eulerian Cycle/Chinese Postman," http://www.2.toki.or.id/bookl AlqDesignManual/ BOOKIBOOK4/NODE165.HTM, Jun. 2, 1997, pp. 1-4.

Ambrosch, Wolf-Dietrich et al., "The Intelligent Network: A Joint Study by Bell Atlantic, IBM and Siemens, Chapter 9. ERS Service Description", 1989, pp. 162-177.

"A Practical Approach to Identifying and Tracking Unauthorized 802.11 Cards and Access Points," Interlink Networks, Inc., 2002, pp. 1-20.

Bahl, Paramvir et al. "RADAR: An In-Building RF-based User Location and Tracking System", Microsoft Research, 2000, pp. 1-10.

Bahl, Paramvir et al. "A Software System for Locating Mobile Users: Design, Evaluation, and Lessons", Microsoft Research, University of California at San Diego, 2000, pp. 1-13.

Balachandran, Anand, et al., "Wireless Hotspots: Current Challenges and Future Directions," WMASH'03, San Diego, California, ACM, Sep. 19, 2003, pp. 1-9.

Battiti, Roberto, et al., "Wireless LANs: From WarChalking to Open Access Networks," Mobile Networks and Applications 10, Springer Science + Business Media, Inc., The Netherlands, Jun. 2005, pp. 275-287.

"Best Practices for Hunting Down & Terminating Rogue Wireless LANs (WLANs)," AirDefense, Inc., 2004, pp. 1-7.

Bhasker, Ezekiel S. et al. "Employing User Feedback for Fast, Accurate, Low-Maintenance Geolocationing", Department of Computer Science and Engineering, University of California, San Diego, 2004, pp. 1-10.

Bjorndahl, Per, et al. "CME20—A Total Solution for GSM Networks", Ericsson Review No. 3, Jun. 1991, pp. 72-79.

"Bluesoft, Inc.'s Aeroscout," Bluesoft, Inc., available at least as early as Aug. 2003, 1 page.

Bogue, Robert L., "Using NetStumbler and MiniStumbler to find Rogue Access Points on Wireless Networks," CIO Top 50 6th Annual Event 2012, Oct. 3, 2012, pp. 1-5.

Brackenridge, Eloise, "The New Urban Infrastructure: Cities and Telecommunications", University of Texas at Austin, Center for Research on Communication, Technology and Society, 1990, pp. 77-100.

Branch, Joel W., et al., "Automatic 802.11 Wireless LAN Security Auditing," Making Wireless Works, IEEE Security & Privacy, May-Jun. 2004, pp. 1-10.

Brewin, Bob, "IBM Develops Tool to Detect Rogue Wireless LAN Access Points," Computerworld, Inc., Jun. 17, 2002, pp. 1-5.

Buccafurno, Mary, "The Philadelphia Story", TE&M Special Report 911, Dec. 15, 1987, pp. 68-72.

Byers, Simon, et al., "802.11B Access Point Mapping," Communications of the ACM, vol. 46, No. 5, ACM, May 2003, pp. 41-46.

"California Legislature Senate Committee on Energy and Public Utilities and Joint Committee on Fire, Police, Emergency and Disaster Services, Joint Interim Hearing on The 911 Emergency Response System—An Overview of its Effectiveness," Los Angeles California, Nov. 21, 1990, pp. 1-107.

Capkun, Srdjan, et al., "GPS-free Positioning in Mobile Ad Hoc Networks, "Cluster Computing 5, Kluwer Academic Publishers, The Netherlands, 2002, pp. 1-11.

Castro , Paul, et al. "A Probabilistic Room Location Service fro Wireless Networked Environments" Ubicomp 2001: Ubiquitious Computing, Intl. Conference Atlanta, GA, Sep. 30-Oct. 2, 2001, pp. 19-34.

(56) References Cited

OTHER PUBLICATIONS

Cellison, "Exploiting and Protecting 802.11b Wireless Networks," ExtremeTech, Sep. 4, 2001, pp. 1-8.
Chawathe, Yatin et al., "A Case Study in Building Layered DHT Applications", Intel Research Seattle, University of California, San Diego, Intel Research Berkeley, ICSI, 2005, pp. 1-15.
Cheng, Yu-Chung et al., "Accuracy Characterization for Metropolitan-scale Wi-Fi Localization" University of California, San Diego; Intel Research Seattle; Microsoft Corporation, 2005, pp. 1-13.
Connelly, Kay et al., "A Toolkit for Automatically Construction Outdoor Radio Maps" Proceedings of the Intl. Conference on Information Technology, Coding and Computing, Apr. 2005, pp. 1-7.
Crow, Owen, "Auditing for Rogue Wireless Access Points in a Large Corporate Campus," Global Information Assurance Certification Paper, Copyright SANS Institute, Sep. 18, 2003, pp. 1-21.
Dayharsh, Thomas et al., "Update on the National Emergency No. 911", IEEE Transactions on Vehicular Technology, vol. VT-28, No. 4, Nov. 1979, pp. 1-6.
"Delta Encoding", Wikipedia, retrieved from http://en.wikipedia.org/wiki/Delta_encoding, Mar. 2006, pp. 1-5.
Delong, Edgar S. Jr. "Making 911 even better" Telephony Integrating Voice and Data Communications, An Intertec Publication, Dec. 14, 1987, pp. 60-63.
Denigris, Ernest, et al. "Enhanced 911: emergency calling with a plus" Bell Laboratories Record, Mar. 1980, pp. 74-79.
"Distributed Wireless Security Auditor," IBM Research and the IBM PC Division, http://www.research.ibm.com/gsal/dwsa, retrieved on Nov. 12, 2012, pp. 1-3.
Eckerson, Wayne, "Users test toll-free net access options", Management Strategies, Network World, Dec. 30, 1991-Jan. 6, 1992, pp. 17-18.
"Ekahau, Ekahau Client 3.0," available at least as early as Oct. 2003, pp. 1-6.
"Ekahau, Ekahau Positioning Engine 2.1," available at least as early as Oct. 2003, pp. 1-9.
"Ekahau, Ekahau Site Survey 1.0," available at least as early as Oct. 2003, pp. 1-4.
"Ekahau Positioning Engine 2.0: 802.11-based Wireless LAN Positioning System," An Ekahau Technology Document, Ekahau, Inc., Nov. 2002, pp. 1-19.
Elnahrawy, Eiman, et al. "Using Areabased Presentations and Metrics for Localization Systems in Wireless LANs" Proceedings of the 29th Annual IEEE Intl. Conference on Local Computer Networks, IEEE Computer Society Press LCN'04, Nov. 2004, pp. 1-9.
European Search Report and Written Opinion for EP12172473.6-2412, dated Nov. 19, 2012, 17 pages.
Supplementary European Search Report, European Application No. 08866698.7-1857 / 2235980, PCT/US2008/087969, Applicant: Skyhook Wireless, Inc., Date of Mailing: Jul. 17, 2014, pp. 1-6.
Etter, Andrew, "A Guide to Wardriving and Detecting Wardrivers," SANS Institute InfoSec Reading Room, Copyright SANS Institute, 2002, pp. 1-16.
Foust, Robert, "Identifying and Tracking Unauthorized 802.11 Cards and Access Points," Login: The Magazine of Usenix & Sage, vol. 27, No. 4, Aug. 2002, pp. 1-13.
Frederickson, Greg N., "Approximation Algorithms for Some Postman Problems," Journal of the Association for Computing Machinery, vol. 26, No. 3, Jul. 1979, pp. 538-554.
"GPSDRIVE," man2html, http://www.gpsdrive.sourceforge.net/gpsdrive_manual-en.html, Sep. 3, 2009, pp. 1-13.
Griswold et al., "ActiveCampus—Sustaining Educational Communities through Mobile Technology," UCSD CSE Technical Report #CS200-0714, Jul. 2002, 19 pages.
Griswold, William G., et al., "ActiveCampus: Experiments in Community-Oriented Ubiquitous Computing," IEEE Computer Society, Oct. 2004, pp. 1-9.

Harvey, Dean et al. "Call Center Solutions" Intelligent Networking: Business Communications Systems, AT&T Technical Journal, vol. 70, No. 5, Sep./Oct. 1991, pp. 1-11.
Hatami, Ahmad et al. "A Comparative Performance Evaluation of RSS-Based Positioning Algorithms Used in WLAN Networks" 2005 IEEE Wireless Communications and Networking Conference, I EEE Communications Society, WCNC vol. 4, Mar. 13-17, 2005, pp. 1-8.
Hazas, M., et al., "Location-Aware Computing Comes of Age," IEEE, vol. 37, Feb. 2004, pp. 95-97.
Head, Charles, "Intelligent Network: A Distributed System" IEEE Communications Magazine, Dec. 1988, pp. 16-20.
Hellebrandt, M., et al., "Estimating Position and Velocity of Mobile in a Cellular Radio Network," IEEE Transactions on Vehicular Technology, vol. 46, No. 1, Feb. 1997, pp. 65-71.
Henderson, Tristan, et al., "The Changing Usage of a Mature Campus-wide Wireless Network," ACM, MobiCom '04, Philadelphia, Pennsylvania, USA, Sep. 26-Oct. 1, 2004, pp. 1-15.
Hightower, Jeffrey et al., "A Survey and Taxonomy of Location Systems for Ubiquitous Computing", University of Washington, Aug. 24, 2001, pp. 1-29.
Hightower, Jeffrey, et al., "Location Sensing Techniques," University of Washington, Computer Science and Engineering, Jul. 30, 2011, pp. 1-8.
Hightower, Jeffrey, et al., "The Location Stack," Intel Research, Intel Corporation, Jul. 2003, pp. 1-13.
Hoeschen, "NetStumbler.org Forums: Calculate AP Physical Location," phpBB Group, Mar. 5, 2004, pp. 1-8.
Honig, William et al. "The Realities of Service Creation on Switching Systems Through Attached Processors" XII International Switching Symposium, vol. VI, May 27-Jun. 1, 1990, pp. 51-54.
Hong, Jason, et al., "Privacy and Client-based Discovery Location," Computer Science Division, University of California, Berkeley, http://www.cs.cmu.edu/~jasonh/publications/puc2004-placelab.pdf, 2004, pp. 1-10.
Hong, Jason I., et al., "Privacy and Security in the Location-enhanced World Wide Web," In Proceedings of the Workshop on Privacy at Ubicomp, 2003, Oct. 2003, pp. 1-5.
"Huffman Coding", Wikipedia, retrieved from http://en.wikipedia.org/wiki/Huffman_coding, Mar. 2006, pp. 1-10.
Hunter, Paul, "The Sources of Innovation in New Jersey Bell Switching Services," Master of Science Thesis, Massachusetts Institute of Technology, Jun. 1991, pp. 1-105.
Hurley, Chris et al., "War Driving Drive, Detect, Defend a Guide to Wireless Security", Syngress Publishing, Inc., 2004, pp. 1-515.
"Implementing 9-1-1 Systems in Texas: Legal and Institutional Background" Texas Advisory Commission on Intergovernmental Relations, Jun. 1998, pp. 1-61.
"Indoor Radio Propagation," Spread Spectrum Scene, SSS Online, Inc., http://www.sss-mag.com/indoor.html, Dec. 10, 1998, pp. 1-7.
International Search Report, International Application No. PCT/US05/39208, mailed Jan. 29, 2008, 3 pages.
International Search Report and Written Opinion, International Application No. PCT/US08/87969, mailed Mar. 10, 2009, 7 pages.
Jin, Ming-Hui et al., "802.11-based Positioning System for Context Aware Applications" GLOBECOM, IEEE 2003, 2003, pp. 1-5.
Kang, Jong Hee et al. "Extracting Places from Traces of Locations" Dept. of Computer Science and Engineering, University of Washington, WMASH '04, Oct. 1, 2004, pp. 110-118.
Kawabata, K., "Estimating Velocity Using Diversity Reception," IEEE, Mar. 1994, pp. 371-374.
Kent, C. A. et al., "Position Estimation of Access Points in 802.11 Wireless Network" Lawrence Livermore National Laboratory, Jan. 21, 2004, pp. 1-10.
Kim, M., et al., "Risks of using AP locations discovered through war driving," Lecture Notes in Computer Science, vol. 3968, Pervasive Computing, May 19, 2006, pp. 67-81.
Kirsner, S., "One more way to find yourself," The Boston Globe, May 23, 2005, Retrieved from www.boston.com, 2 pages.
Kirtner, Jody L., M. A., et al., "The Application of Land Use/Land Cover Data to Wireless Communication System Design," EDX Engineering, Inc., http://proceedings.esri.com/library/userconf/proc98/PROCEED/TO550/PAP525/P525.HTM, 1998, pp. 1-16.

(56) References Cited

OTHER PUBLICATIONS

"Kismet," Kismet Wirelss, Inc., http://www.kismetwirelss.net/documentaion.shtml, retrieved on Nov. 11, 2012, pp. 1-47.
Komar, Can, et al., "Location Tracking and Location Based Service Using IEEE 802.11 WLAN Infrastructure," European Wireless 2004, Barcelona Spain, Feb. 24-27, 2004, pp. 1-7.
Krumm, J., et al., "LOCADIO: Inferring Motion and Location from Wi-Fi Signal Strengths," First Annual International Conference on Mobile and Ubiquitous Systems: Networking and Services, Aug. 2004, 10 pages.
Krumm, John et al. "The NearMe Wireless Proximity Server" UbiComp 2004, LNCS 3205, 2004, pp. 283-300.
Kucan, Berislav, "WarDriving: Drive, Detect, Defend, A Guide to Wireless Security," Help Net Security, Oct. 12, 2004, pp. 1-3.
Kwan, M., "Graphic Programming Using Odd or Even Points," Chinese Math. 1, 1962, pp. 273-277.
Kwan, Robert K., "GLOBALSTAR: Linking the World via Mobile Connections", IEEE Intl Symposium on Personal, Indoor & Mobile Radio Communications, Sep. 24-25, 1991, pp. 318-323.
Lackey, Dr. Joshua, Phd., et al., "Wireless Intrusion Detection," IBM Global Services, IBM Corporation, Apr. 2003, pp. 1-16.
Lamarca, Anthony, et al., "Finding Yourself: Experimental Location Technology Relies on Wi-Fi and Cellphone Signals Instead of Orbiting Satellites," Resources, IEEE Spectrum, Dec. 2004, pp. 1-3.
Lamarca, Anthony, et al., "Place Lab: Bootstrapping Where-ware," http://www.powershow.com/view/aae05-ZGI1Y/Place_Lab_Bootstrapping_Whereware_powerpoint_ppt_presentation, 2003, pp. 1-19.
Lamarca, Anthony et al., "Place Lab: Device Positioning Using Radio Beacons in the Wild" Intel Research Seattle; Intel Research Cambridge; UC San Diego; University of Washington; Information School, University of Washington, 2004, pp. 1-20.
Lamarca, Anthony et al., "Place Lab: Device Positioning Using Radio Beacons in the Wild" Pervasive 2005, LNCS 3468, co. 116-133, 2005, pp. 1-18.
Lamarca, A., et al., "Place Lab: Device Positioning Using Radio Beacons in the Wild," Pervasive Computing, Intel Corporation, Oct. 2004, pp. 116-133.
Lamarca, Anthony, et al., "Place Lab's First Step: A Location-Enhanced Conference Guide," Demonstration at UbiComp 2003, Oct. 2003, pp. 1-3.
Lamarca, A., et al., "Self-Mapping in 802.11 Location Systems," Ubicomp 2005: Ubiquitous Computing, Intel Corporation, Aug. 23, 2005, pp. 87-104.
Leslie, David, "Rouge Wireless Access Point Detection and Remediation," SANS GSEC (v 1.4) Option 1, Global Information Assurance Certification Paper, Copyright SANS Institute, Sep. 9, 2004, pp. 1-15.
Letchner, Julia, et al., "Large-Scale Localization from Wireless Signal Strength," Proc. of the National Conference on Artificial Intelligence (AAAI), American Association for Artificial Intelligence, Jul. 2005, pp. 1-6.
"LocalePoints," Newbury Networks, available at least as early as Oct. 2004, 1 page.
LocaleServer, Newbury Networks, available at least as early as Oct. 2004, 1 page.
Lorinez, Konrad et al., "MoteTrack: A Robust, Decentralized Approach to RFBased Location Tracking" LoCA 2005, LNCS 3479, May 2005, pp. 63-82.
Mallinder, Bernard J.T., "The Final Countdown to GSM", 1991 Pan European Digital Cellular Radio Conference, Acropolis Conference Center, Nice, France, Feb. 5, 1991, pp. 1-12.
Milner, Marius, "NetStumbler v0.4.0 Release Notes," http://www.netstumbler.org/netstumbler-faqs/official-netstumbler-0-4-0-readme-t10366.html, Apr. 21, 2004, pp. 1-10.
Muthukrishnan, K., et al., "Towards Smart Surroundings: Enabling Techniques and Technologies for Localization," Lecture Notes in Computer Science, vol. 3479, May 2005, 11 pages.

Myllymaki, Jussi, et al., "Location Aggregation from Multiple Sources," Mobile Data Management, 2002 Proceedings, Third International Conference, IEEE, Jan. 8-11, 2002, pp. 1-8.
"PanGo Mobile Applications Suite," Pango, available at least as early as Aug. 2003, pp. 1-2.
"PanGo Proximity Platform," Pango, available at least as early as Oct. 2003, pp. 1-2.
Papadimitriou, Christos H., "On the Complexity of Edge Traversing," Journal of the Association for Computing Machinery, vol. 23, No. 3, Jul. 1976, pp. 544-554.
Raniwala, Ashish, et al., "Deployment Issues in Enterprise Wireless LANs," Department of Computer Science, Stony Brook University, Mar. 31, 2009, pp. 1-36.
Robinson, Michael et al. "Received Signal Strength Based Location Estimation of a Wireless LAN Client" 2005 IEEE Wireless Communications and Networking Conference, IEEE Communications Society, WCNC vol. 4, Mar. 13-17, 2005, pp. 1-6.
Russell, Dr. Steve, "Detecting and Locating Rogue Access Points," CprE 537, Spring 2003, Apr. 28, 2003, pp. 1-40.
Saha, Siddhartha et al. "Location Determination of a Mobile Device Using IEEE 802.11b Access Point Signals" 2003 IEEE Wireless Communications and Networking Conference, IEEE Communications Society, Mar. 16-20, 2003, pp. 1987-1992.
Schilit, Bill N. et al., "Bootstrapping the Location-enhanced Word Wide Web" Intel Research Seattle; University of Washington; University of California at San Diego; University of California at Berkeley, 2003, pp. 1-4.
Schilit, Bill N. et al., "Challenge: Ubiquitous Location-Aware Computing and the "Place Lab" Initiative" Dept. of Computer Science and Engineering, University of Washington, WMASH '03, Sep. 19, 2003, pp. 29-35.
Schilit, Bill, Location Enhanced Web Services, "Computer Science & Engineering Colloquium Series," Intel Research, Seattle, transcript by Henderson Legal Services, Inc., 2003, pp. 1-58.
Shih, Johnny, "Wireless LAN Location System," School of Information Technology and Electrical Engineering, The University of Queensland, Nov. 21, 2003, pp. 1-98.
Shipley, Peter, "802.11b War Driving and LAN Jacking", DEFCON 9 Conference, Las Vegas, Nevada, USA, Jul. 13-15, 2001, pp. 1-39.
Shipley, Peter, "Open WLANs the early results of war Driving" DEFCON9 Conference 802.11b War Driving Presentation, Jul. 13, 2001, pp. 1-49.
Skyhook Wireless, Inc. v. Google, Inc., Complaint for Patent Infringement against Google, Inc. (with 6 Exhibits), filed in the United States District Court of Massachusetts, Case No. 1:10-cv-11571-RWZ, on Sep. 15, 2010, pp. 1-89.
Skyhook Wireless, Inc. v. Google, Inc., Answer to Complaint, with Jury Demand, Counterclaim against Skyhook Wireless, Inc. By Google, Inc. filed in the United States District Court of Massachusetts, Case No. 1:10-cv-11571-RWZ, on Oct. 29, 2010, pp. 1-9.
Skyhook Wireless, Inc. v. Google, Inc., Answer to Counterclaim by Skyhook Wireless, Inc. filed in the United States District Court of Massachusetts, Case No. 1:10-cv-11571-RWZ, on Nov. 22, 2010, pp. 1-4.
Skyhook Wireless, Inc. v. Google, Inc., Joint Submission pursuant to Local Rule 16.1 Joint Statement by Google, Inc. (with Exhibit A-B) filed in the United States District Court of Massachusetts, Case No. 1:10-cv-11571-RWZ, on Dec. 7, 2010, pp. 1-17.
Skyhook Wireless, Inc. v. Google, Inc., Notice by Skyhook Wireless, Inc. of Preliminary Infringement Disclosure (Redacted) (with 4 Exhibits) filed in the United States District Court of Massachusetts, Case No. 1:10-cv-11571-RWZ, on Feb. 14, 2011, pp. 1-39.
Skyhook Wireless, Inc. v. Google, Inc., Notice by Google, Inc. of Preliminary Non-Infringement Contentions (Redacted) filed in the United States District Court of Massachusetts, Case No. 1:10-cv-11571-RWZ, on Apr. 15, 2011, pp. 1-14.
Skyhook Wireless, Inc. v. Google, Inc., Notice by Google, Inc. of Preliminary Invalidity Contentions (with Exhibit A) filed in the United States District Court of Massachusetts, Case No. 1:10-cv-11571-RWZ, on Apr. 15, 2011, pp. 1-81.

(56) References Cited

OTHER PUBLICATIONS

*Skyhook Wireless, Inc.* v. *Google, Inc.*, Motion for Summary Judgment of Indefiniteness by Google, Inc. filed in the United States District Court of Massachusetts, Case No. 1:10-cv-11571-RWZ, on Sep. 14, 2011, pp. 1-4.
*Skyhook Wireless, Inc.* v. *Google, Inc.*, Memorandum in Support re: MOTION for Summary Judgment of Indefiniteness and, in the Alternative, Opening Claim Construction Brief filed by Google, Inc. filed in the United States District Court of Massachusetts, Case No. 1:10-cv-11571-RWZ, on Sep. 14, 2011, pp. 1-41.
*Skyhook Wireless, Inc.* v. *Google, Inc.*, Declaration of Anthony S. Acampora, Ph.D. by Google, Inc. (with Exhibit 1) filed in the United States District Court of Massachusetts, Case No. 1:10-cv-11571-RWZ, on Sep. 14, 2011, pp. 1-114.
*Skyhook Wireless, Inc.* v. *Google, Inc.*, Statement of facts re: Motion for Summary Judgment of Indefiniteness Pursuant to Local Rule 56.1 filed in the United States District Court of Massachusetts, Case No. 1:10-cv-11571-RWZ, on Sep. 14, 2011, pp. 1-12.
*Skyhook Wireless, Inc.* v. *Google, Inc.*, Declaration of Susan Baker Manning in Support of Google Inc.'s Motion for Summary Judgement of Indefiniteness and, in the Alternative, Opening Claim Construction Brief by Google, Inc. (with Exhibits A-F) filed in the United States District Court of Massachusetts, Case No. 1:10-cv-11571-RWZ, on Sep. 14, 2011, pp. 1-118).
*Skyhook Wireless, Inc.* v. *Google, Inc.*, Declaration of Susan Baker Manning in Support of Google Inc.'s Motion for Summary Judgement of Indefiniteness and, in the Alternative, Opening Claim Construction Brief by Google, Inc. (with Exhibits G-L) filed in the United States District Court of Massachusetts, Case No. 1:10-cv-11571-RWZ, on Sep. 14, 2011, pp. 1-105.
*Skyhook Wireless, Inc.* v. *Google, Inc.*, Declaration of Susan Baker Manning in Support of Google Inc.'s Motion for Summary Judgement of Indefiniteness and, in the Alternative, Opening Claim Construction Brief by Google, Inc (with Exhibits M-S) filed in the United States District Court of Massachusetts, Case No. 1:10-cv-11571-RWZ, on Sep. 14, 2011, pp. 1-107.
*Skyhook Wireless, Inc.* v. *Google, Inc.*, Declaration of Susan Baker Manning in Support of Google Inc.'s Motion for Summary Judgement of Indefiniteness and, in the Alternative, Opening Claim Construction Brief by Google, Inc. (with Exhibit T-BB) filed in the United States District Court of Massachusetts, Case No. 1:10-cv-11571-RWZ, on Sep. 14, 2011, pp. 1-92.
*Skyhook Wireless, Inc.* v. *Google, Inc.*, Preliminary Claim Construction Briefs by Skyhook Wireless, Inc. filed in the United States District Court of Massachusetts, Case No. 1:10-cv-11571-RWZ, on Sep. 14, 2011, pp. 1-45.
*Skyhook Wireless, Inc.* v. *Google, Inc.*, Affidavit in Support re: Preliminary Claim Construction Briefs (with 15 Exhibits) filed in the United States District Court of Massachusetts, Case No. 1:10-cv-11571-RWZ, on Sep. 14, 2011, pp. 1-140.
*Skyhook Wireless, Inc.* v. *Google, Inc.*, Opposition re Motion for Summary Judgment of Indefiniteness and Skyhook's Reply Claim Construction Brief filed by Skyhook Wireless, Inc. filed in the United States District Court of Massachusetts, Case No. 1:10-cv-11571-RWZ, on Sep. 28, 2011, pp. 1-34.
*Skyhook Wireless, Inc.* v. *Google, Inc.*, Reply to Preliminary Claim Construction Briefs by Google, Inc. filed in the United States District Court of Massachusetts, Case No. 1:10-cv-11571-RWZ, on Sep. 28, 2011, pp. 1-31.
*Skyhook Wireless, Inc.* v. *Google, Inc.*, Declaration of Catherine R. Murphy in Support of Google Inc.'s Opposition to Skyhook Wireless, Inc.'s Opening Claim Construction Brief by Google, Inc. (with Exhibits A-C) filed on Sep. 28, 2011, pp. 1-30.
*Skyhook Wireless, Inc.* v. *Google, Inc.*, Affidavit of Samuel K. Lu re: Opposition to Motion by Skyhook Wireless, Inc. (with Exhibits A-M) filed in the United States District Court of Massachusetts, Case No. 1:10-cv-11571-RWZ, on Sep. 28, 2011, pp. 1-254.
*Skyhook Wireless, Inc.* v. *Google, Inc.*, Statement of Material Facts L.R. 56.1 re: Motion for Summary Judgment of Indefiniteness filed by Skyhook Wireless, Inc. filed in the United States District Court of Massachusetts, Case No. 1:10-cv-11571-RWZ, on Sep. 28, 2011, pp. 1-12.
*Skyhook Wireless, Inc.* v. *Google, Inc.*, Affidavit of Dr. David Kotz re Opposition to Motion by Skyhook Wireless, Inc. (with 1 Exhibit) filed in the United States District Court of Massachusetts, Case No. 1:10-cv-11571-RWZ, on Sep. 28, 2011, pp. 1-70.
*Skyhook Wireless, Inc.* v. *Google, Inc.*, Preliminary Invalidity and Non-Infringement Contentions by Google, Inc. (with 1 Exhibit) filed in the United States District Court of Massachusetts, Case No. 1:10-cv-11571-RWZ, on Oct. 7, 2011, pp. 1-108.
*Skyhook Wireless, Inc.* v. *Google, Inc.*, Joint Claim Construction and Prehearing Statement by Skyhook Wireless, Inc. (with 49 Exhibits) filed in the United States District Court of Massachusetts, Case No. 1:10-cv-11571-RWZ, on Oct. 13, 2011, pp. 1-744.
*Skyhook Wireless, Inc.* v. *Google, Inc.*, Reply to Response to Motion for Summary Judgment of Indefiniteness filed by Google, Inc filed in the United States District Court of Massachusetts, Case No. 1:10-cv-11571-RWZ, on Oct. 18, 2011, pp. 1-22.
*Skyhook Wireless, Inc.* v. *Google, Inc.*, Declaration re Reply to Response to Motion for Summary Judgment of Indefiniteness by Google, Inc. (with 5 Exhibits) filed in the United States District Court of Massachusetts, Case No. 1:10-cv-11571-RWZ, on Oct. 18, 2011, pp. 1-213.
*Skyhook Wireless, Inc.* v. *Google, Inc.*, Motion to Strike by Skyhook Wireless, Inc. (with 1 Exhibit) filed in the United States District Court of Massachusetts, Case No. 1:10-cv-11571-RWZ, on Oct. 20, 2011, pp. 1-13.
*Skyhook Wireless, Inc.* v. *Google, Inc.*, Judge Rya W. Zobel: Memorandum & Decision entered granting in part and denying in part Motion for Summary Judgment filed in the United States District Court of Massachusetts, Case No. 1:10-cv-11571-RWZ, on Sep. 14, 2012, pp. 1-37.
*Skyhook Wireless, Inc.* v. *Google, Inc.*, Joint Statement re scheduling conference filed in the United States District Court of Massachusetts, Case No. 1:10-cv-11571-RWZ, on Oct. 4, 2012, pp. 1-7.
*Skyhook Wireless, Inc.* v. *Google, Inc.*, Amended Document by Google, Inc. Amendment to Preliminary Non-Infringement Contentions filed in the United States District Court of Massachusetts, Case No. 1:10-cv-11571-RWZ, on Nov. 13, 2012, pp. 1-13.
*Skyhook Wireless, Inc.* v. *Google, Inc.*, Second Amended Document by Google, Inc. Amendment to Preliminary Invalidity Contentions filed in the United States District Court of Massachusetts, Case No. 1:10-cv-11571-RWZ, on Nov. 13, 2012, pp. 1-77.
*Skyhook Wireless, Inc.* v. *Google, Inc.*, Amended Complaint for Patent Infringement against Google, Inc., filed by Skyhook Wireless, Inc. (with Exhibits A-M) filed in the United States District Court of Massachusetts, Case No. 1:10-cv-11571-RWZ, on Mar. 29, 2013, pp. 1-291.
*Skyhook Wireless, Inc.* v. *Google, Inc.*, Answer to Counterclaim by Skyhook Wireless, Inc. filed in the United States District Court of Massachusetts, Case No. 1:10-cv-11571-RWZ, on May 8, 2013, pp. 1-6.
*Skyhook Wireless, Inc.* v. *Google, Inc.*, Defendant Google Inc.'s Answer to Amended Complaint, Counterclaim against Skyhook Wireless, Inc. By Google, Inc. (with Exhibit A) filed in the United States District Court of Massachusetts, Case No. 1:10-cv-11571-RWZ, on Apr. 24, 2013, pp. 1-62.
*Skyhook Wireless, Inc.* v. *Google, Inc.*, First Amended Preliminary Invalidity Disclosures by Google, Inc. (with Exhibits A-B) filed in the United States District Court of Massachusetts, Case No. 1:10-cv-11571-RWZ, on Sep. 10, 2013, pp. 1-389.
*Skyhook Wireless, Inc.* v. *Google, Inc.*, Joint Claim Construction and Prehearing Statement by Skyhook Wireless, Inc. (with Exhibits A-B and Exhibits 1-25) entered in the United States District Court of Massachusetts, Case No. 1:10-cv-11571-RWZ, on Sep. 25, 2013, pp. 1-561.
*Skyhook Wireless, Inc.* v. *Google, Inc.*, Judge Rya W. Zobel: Final Revised Claim Construction order entered in the United States District Court of Massachusetts, Case No. 1:10-cv-11571-RWZ, on Jan. 23, 2015, pp. 1-11.
*Skyhook Wireless, Inc.* v. *Google, Inc.*, Judge Rya W. Zobel: Memorandum of Decision entered denying Motion for Summary

(56) References Cited

OTHER PUBLICATIONS

Judgment entered in the United States District Court of Massachusetts, Case No. 1:10-cv-11571-RWZ, on Feb. 18, 2015, pp. 1-50.
*Skyhook Wireless, Inc.* v. *Google, Inc.*, Judge Rya W. Zobel: Order entered in the United States District Court of Massachusetts, Case No. 1:10-cv-11571-RWZ, on Mar. 5, 2015, p. 1.
*Skyhook Wireless, Inc.* v. *Google, Inc.*, Memorandum in Support regarding Motion for Summary Judgment of Invalidity for Indefiniteness of the '454, '074 and '960 Patents by Google, Inc. filed in the United States District Court of Massachusetts, Case No. 1:10-cv-11571-RWZ, on Nov. 8, 2014, pp. 1-82.
*Skyhook Wireless, Inc.* v. *Google, Inc.*, Motion for Partial Summary Judgment Google's Motion for Partial Summary Judgment of Invalidity for Indefiniteness Under 35 U.S.C. § 112 ¶ 2 (with Exhibit A) filed in the United States District Court of Massachusetts, Case No. 1:10-cv-11571-RWZ, on Sep. 12, 2013, pp. 1-4.
*Skyhook Wireless, Inc.* v. *Google, Inc.*, Motion for Summary Judgment of Invalidity for Indefiniteness of the '454, '074 and '960 Patents by Google, Inc. filed in the United States District Court of Massachusetts, Case No. 1:10-cv-11571-RWZ, on Nov. 7, 2014, pp. 1-3.
*Skyhook Wireless, Inc.* v. *Google, Inc.*, Opposition regarding Motion for Summary Judgment of Invalidity for Indefiniteness of the '454, '074 and '960 Patents by Skyhook Wireless Inc. filed in the United States District Court of Massachusetts, Case No. 1:10-cv-11571-RWZ, on Dec. 5, 2014, pp. 1-23.
*Skyhook Wireless, Inc.* v. *Google, Inc.*, Preliminary Invalidity Disclosures by Google, Inc. (with Exhibits A-I) filed in the United States District Court of Massachusetts, Case No. 1:10-cv-11571-RWZ, on Jun. 14, 2013, pp. 1-1629.
*Skyhook Wireless, Inc.* v. *Google, Inc.*, Preliminary Invalidity and Non-Infringement Contentions by Google, Inc. (with Exhibits A-G) entered in the United States District Court of Massachusetts, Case No. 1:10-cv-11571-RWZ, on Apr. 30, 2014, pp. 1-1235.
*Skyhook Wireless, Inc.* v. *Google, Inc.*, Preliminary Invalidity and Non-Infringement Contentions by Google, Inc. filed in the United States District Court of Massachusetts, Case No. 1:10-cv-11571-RWZ, on Jun. 14, 2013, pp. 1-50.
*Skyhook Wireless, Inc.* v. *Google, Inc., Reply to Response to Motion for Summary Judgment of Invalidity for Indefiniteness of the '454, '074 and '960 Patents* by Google, Inc. filed in the United States District Court of Massachusetts, Case No. 1:10-cv-11571-RWZ, on Dec. 15, 2014, pp. 1-8.
*Skyhook Wireless, Inc.* v. Google, Inc., Response by Skyhook Wireless, Inc. To Sealed document Google's Opening Claim Construction Brief filed in the United States District Court of Massachusetts, Case No. 1:10-cv-11571-RWZ, on Sep. 16, 2013, pp. 1-34.
*Skyhook Wireless, Inc.* v. *Google, Inc.*, Trial Brief by Google, Inc. filed in the United States District Court of Massachusetts, Case No. 1:10-cv-11571-RWZ, on Mar. 2, 2015, pp. 1-14.

*Skyhook Wireless, Inc.* v. *Google, Inc.*, Trial Brief Corrected by Skyhook Wireless, Inc. filed in the United States District Court of Massachusetts, Case No. 1:10-cv-11571-RWZ, on Mar. 2, 2015, pp. 1-25.
Small, Jason, et al., "Determining User Location for Context Aware Computing Through the Use of a Wireless LAN Infrastructure," submitted for publication to ACM Mobile Networks and Applications, vol. 6, 2001, pp. 1-8.
Spielman, Sue and Philip Brittan, "Java and GIS, Part 1: Intro to GIS," Feb. 16, 2004, pp. 1-4.
Spielman, Sue and Simon Brown, "Java and GIS, Part 2: Mobile LBS," Apr. 1, 2004, pp. 1-6.
Sterling, David et al. "The Iridium System—A Revolutionary satellite Communications System Developed with Innovative Applications of Technology", IEEE Communications Society, Milcom '91,1991, pp. 0436-0440.
Stone, Anthony, "Kismet & GPSdrive: Wireless Network Sniffing with Open Source Software," UKUUG Leeds, 2004, pp. 1-32.
Taheri, Ali, et al. Location Fingerprinting on Infrastructure 802.11 Wireless Local Area Networks (WLANs) using Locus, 29th Conference on Local Computer Networks, IEEE Communications Society, Nov. 16-18, 2004, pp. 1-9.
"Terminal Equipment and Protocols for Telematic Services: Information Technology-Digital Compression and Coding of Continuous-Tome Still Images—Requirements and Guidelines," International Telecommunication Union, Sep. 1992, pp. 1-186.
Torrone, Phillip, "How-To Tuesday: War Kayaking," Engadget, AOL, Inc., http://www.engadget.com/2004/06/22/how-to-Tuesday-war-kayaking/, Jun. 22, 2004, pp. 1-5.
Wallace, Bob, "Domino's delivers using new call routing service" Network World, vol. 8, No. 32, Aug. 12, 1991, pp. 1-2.
Wang, Yufei, et al., "Two New Algorithms for Indoor Wireless Positioning System (WPS)," Proceedings of the 17th International Technical Meeting of the Satellite Division of the Institute of Navigation (ION GNSS 2004), Long Beach, CA, Sep. 2004, pp. 1-8.
"Wardriving as a Proxy for Wi-Fi GPS Location" Netstumbler Blog Posting, http://www.netstumbler.org/news/wardriving-as-a-proxy-for-wi-fi-gps locationt10762.html, May 2004, pp. 1-7.
Weisstein, Eric W., "Chinese Postman Problem," Mathworld—A Wolfman Web Resource, retrieved from http://mathworld.wolfram.com/ChinesePostmanProblem.html, 2010, 1 page.
Welch, Colonel Donald J., Ph.D., et al., "A Survey of 802.11a Wireless Security Threats and Security Mechanisms," A Technical Report to the Army G6, Technical Report ITOC-TR-2003-101, Unclassified, Information Technology and Operations Center, Department of Electrical Engineering and Computer Science, United States Military Academy, West Point, New York, 2003, pp. 1-20.
Workman, Alexandra et. al. "International Applications of AT&T's Intelligent Network Platforms", AT&T Technical Journal, 1991, vol. 70, No. 34, 1991, pp. 4-57.
Zobel, D.J., Memorandum of Decision, United States District Court District of Massachusetts, Civil Action No. 10-11S71-RWZ, *Skyhook Wireless, Inc.* v. *Google, Inc.*, Sep. 14, 2012.

Figure 3: Example scanning scenario showing arterial bias

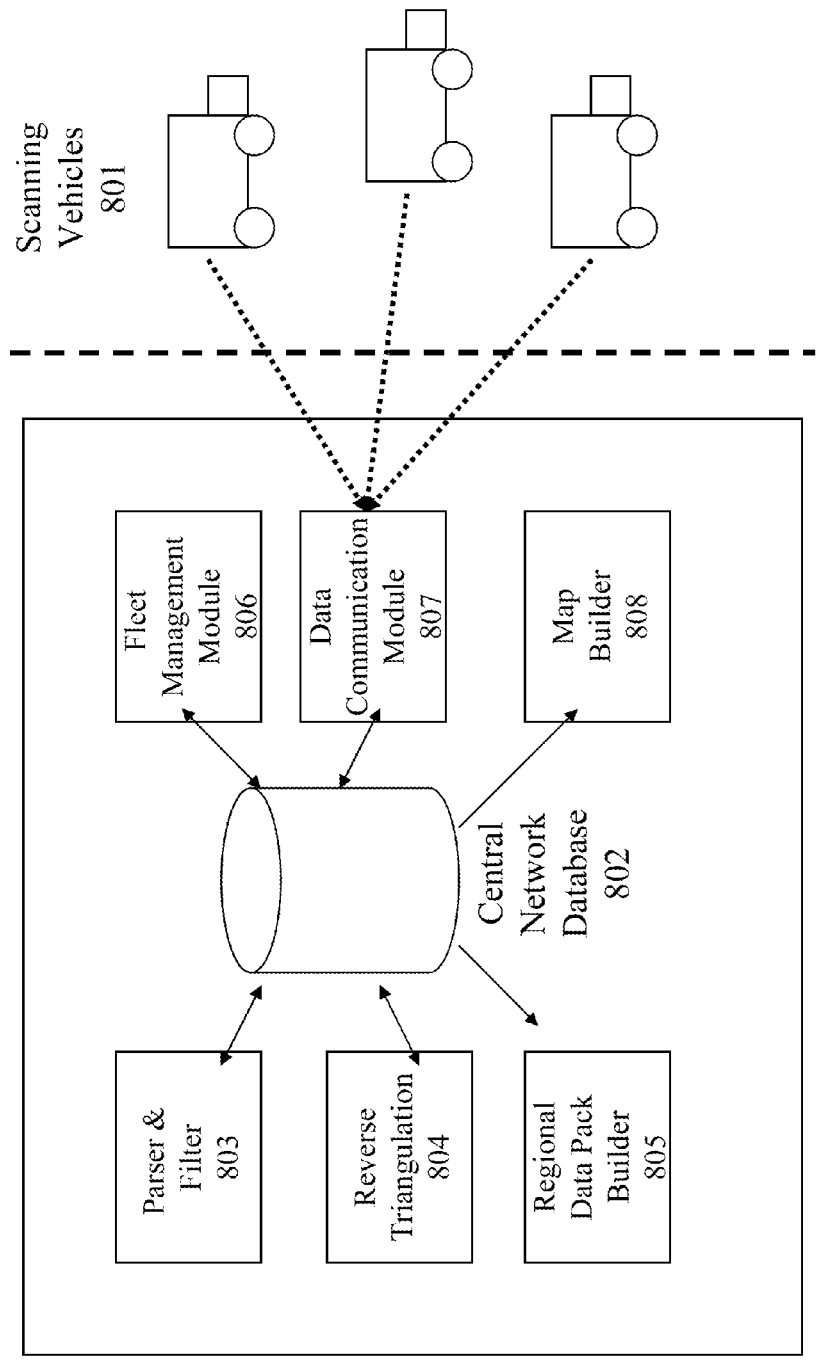

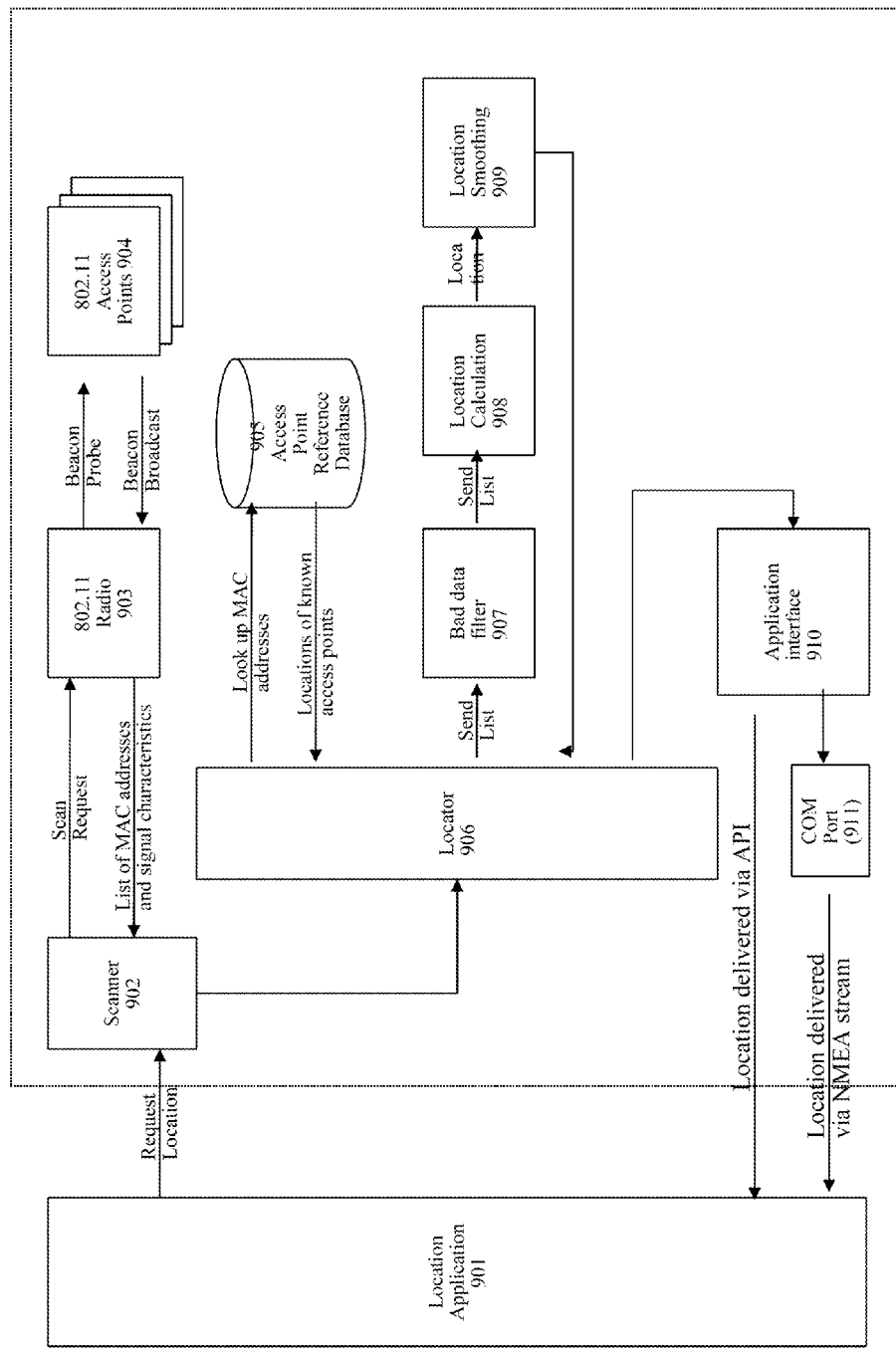
Figure 9: Positioning Software

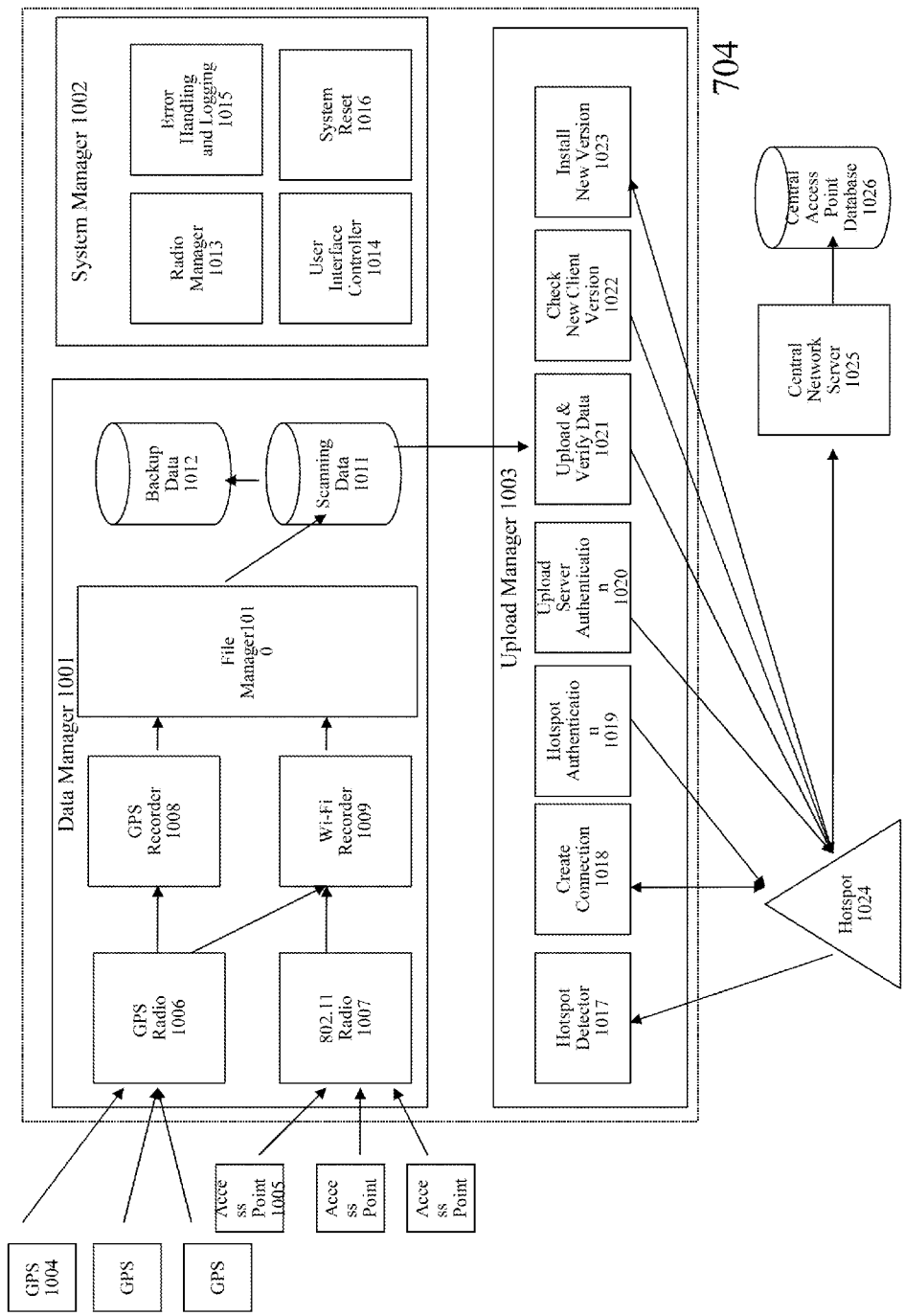
Figure 10: Scanning Client

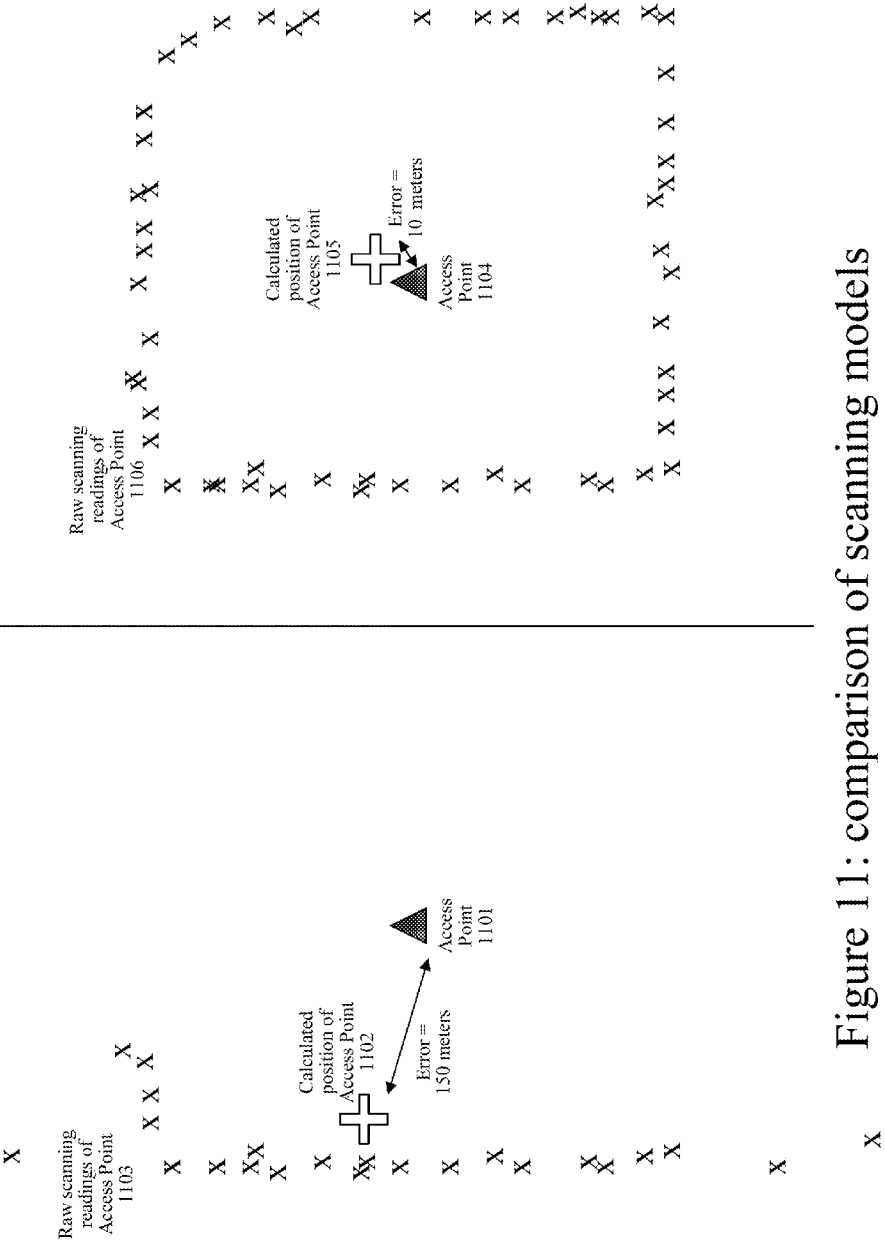
Figure 11: comparison of scanning models

TECHNIQUES FOR COMPUTING LOCATION OF A MOBILE DEVICE BASED ON OBSERVED WI-FI ACCESS POINTS

CROSS-REFERENCE TO RELATED APPLICATIONS

This application is a continuation of prior U.S. patent application Ser. No. 14/456,310, entitled Techniques for Computing Location of a Mobile Device Based on Observed Wi-Fi Access Points, filed Aug. 11, 2014, which is itself a continuation of U.S. patent application Ser. No. 13/225,848, now U.S. Pat. No. 8,837,363, entitled Server for Updating Location Beacon Database, filed Sep. 6, 2011, which is itself a continuation of prior U.S. patent application Ser. No. 12/190,683, now U.S. Pat. No. 8,031,657, entitled Server for Updating Location Beacon Database, filed Aug. 13, 2008, which is itself a continuation of prior U.S. patent application Ser. No. 11/261,898, now U.S. Pat. No. 7,414,988, filed Oct. 28, 2005, entitled Server For Updating Location Beacon Database, which claims the benefit under 35 U.S.C. §119(e) of U.S. Provisional Patent Application No. 60/623,108, filed Oct. 29, 2004, entitled Wireless Data Scanning Network for Building Location Beacon Database, all of which are herein incorporated by reference in their entirety.

This application is related to the following U.S. Patent Applications:

U.S. patent application Ser. No. 11/261,848, now U.S. Pat. No. 7,433,694, filed Oct. 28, 2005, entitled Location Beacon Database;

U.S. patent application Ser. No. 11/261,988, now U.S. Pat. No. 7,305,245, filed on Oct. 28, 2005, entitled Location-Based Services That Choose Location Algorithms Based On Number Of Detected Access Points Within Range Of User Device;

U.S. patent application Ser. No. 11/261,987, now U.S. Pat. No. 7,403,762, filed Oct. 28, 2005, entitled Method and System for Building a Location Beacon Database;

U.S. patent application Ser. No. 11/950,178, now U.S. Pat. No. 7,769,396, filed Dec. 4, 2007, entitled Location-Based Services That Choose Location Algorithms Based On Number Of Detected Access Points Within Range Of User Device; and U.S. patent application Ser. No. 11/950,242, now U.S. Pat. No. 7,818,017, filed Dec. 4, 2007, entitled Location-Based Services That Choose Location Algorithms Based On Number Of Detected Wireless Signal Stations Within Range Of User Device.

BACKGROUND

Field of the Invention

The invention generally related to location-based services and, more specifically, to methods and systems of determining locations of Wi-Fi access points and using such information to locate a Wi-Fi-enabled device.

Discussion of Related Art

In recent years the number of mobile computing devices has increased dramatically creating the need for more advanced mobile and wireless services. Mobile email, walkie-talkie services, multi-player gaming and call following are examples of how new applications are emerging on mobile devices. In addition, users are beginning to demand/seek applications that not only utilize their current location but also share that location information with others. Parents wish to keep track of their children, supervisors need to track the location of the company's delivery vehicles, and a business traveler looks to find the nearest pharmacy to pick up a prescription. All of these examples require the individual to know their own current location or that of someone else. To date, we all rely on asking for directions, calling someone to ask their whereabouts or having workers check-in from time to time with their position.

Location-based services are an emerging area of mobile applications that leverages the ability of new devices to calculate their current geographic position and report that to a user or to a service. Some examples of these services include local weather, traffic updates, driving directions, child trackers, buddy finders and urban concierge services. These new location sensitive devices rely on a variety of technologies that all use the same general concept. Using radio signals coming from known reference points, these devices can mathematically calculate the user's position relative to these reference points. Each of these approaches has its strengths and weaknesses based on the radio technology and the positioning algorithms they employ.

The Global Positioning System (GPS) operated by the US Government leverages dozens of orbiting satellites as reference points. These satellites broadcast radio signals that are picked up by GPS receivers. The receivers measure the time it took for that signal to reach to the receiver. After receiving signals from three or more GPS satellites the receiver can triangulate its position on the globe. For the system to work effectively, the radio signals must reach the received with little or no interference. Weather, buildings or structures and foliage can cause interference because the receivers require a clear line-of-sight to three or more satellites. Interference can also be caused by a phenomenon known as multi-path. The radio signals from the satellites bounce off physical structures causing multiple signals from the same satellite to reach a receiver at different times. Since the receiver's calculation is based on the time the signal took to reach the receiver, multi-path signals confuse the receiver and cause substantial errors.

Cell tower triangulation is another method used by wireless and cellular carriers to determine a user or device's location. The wireless network and the handheld device communicate with each other to share signal information that the network can use to calculate the location of the device. This approach was originally seen as a superior model to GPS since these signals do not require direct line of site and can penetrate buildings better. Unfortunately these approaches have proven to be suboptimal due to the heterogeneous nature of the cellular tower hardware along with the issues of multi-path signals and the lack of uniformity in the positioning of cellular towers.

Assisted GPS is a newer model that combines both GPS and cellular tower techniques to produce a more accurate and reliable location calculation for mobile users. In this model, the wireless network attempts to help GPS improve its signal reception by transmitting information about the clock offsets of the GPS satellites and the general location of the user based on the location of the connected cell tower. These techniques can help GPS receivers deal with weaker signals that one experiences indoors and helps the receiver obtain a 'fix' on the closest satellites quicker providing a faster "first reading". These systems have been plagued by slow response times and poor accuracy—greater than 100 meters in downtown areas.

There have been some more recent alternative models developed to try and address the known issues with GPS, A-GPS and cell tower positioning. One of them, known as TV-GPS, utilizes signals from television broadcast towers. (See, e.g., Muthukrishnan, Maria Lijding, Paul Havinga, Towards Smart Surroundings: Enabling Techniques and Technologies for Localization, Lecture Notes in Computer Science, Volume 3479, January 2 Hazas, M., Scott, J., Krumm, J.: Location-Aware Computing Comes of Age. IEEE Computer, 37(2):95-97, February 2004 005, Pa005, Pages 350-362.) The concept relies on the fact that most metropolitan areas have 3 or more TV broadcast towers. A proprietary hardware chip receives TV signals from these various towers and uses the known positions of these towers as reference points. The challenges facing this model are the cost of the new hardware receiver and the limitations of using such a small set of reference points. For example, if a user is outside the perimeter of towers, the system has a difficult time providing reasonable accuracy. The classic example is a user along the shoreline. Since there are no TV towers out in the ocean, there is no way to provide reference symmetry among the reference points resulting in a calculated positioning well inland of the user.

Microsoft Corporation and Intel Corporation (via a research group known as PlaceLab) have deployed a Wi-Fi Location system using the access point locations acquired from amateur scanners (known as "wardrivers") who submit their Wi-Fi scan data to public community web sites. (See, e.g., LaMarca, A., et. al., Place Lab: Device Positioning Using Radio Beacons in the Wild.) Examples include WiGLE, Wi-FiMaps.com, Netstumbler.com and NodeDB. Both Microsoft and Intel have developed their own client software that utilizes this public wardriving data as reference locations. Because individuals voluntarily supply the data the systems suffer a number of performance and reliability problems. First, the data across the databases are not contemporaneous; some of the data is new while other portions are 3-4 years old. The age of the access point location is important since over time access points can be moved or taken offline. Second, the data is acquired using a variety of hardware and software configurations. Every 802.11 radio and antenna has different signal reception characteristics affecting the representation of the strength of the signal. Each scanning software implementation scans for Wi-Fi signals in different ways during different time intervals. Third, the user-supplied data suffers from arterial bias. Because the data is self-reported by individuals who are not following designed scanning routes, the data tends to aggregate around heavily traffic areas. Arterial bias causes a resulting location pull towards main arteries regardless of where the user is currently located causing substantial accuracy errors. Fourth, these databases include the calculated position of scanned access points rather than the raw scanning data obtained by the 802.11 hardware. Each of these databases calculates the access point location differently and each with a rudimentary weighted average formula. The result is that many access points are indicated as being located far from their actual locations including some access points being incorrectly indicated as if they were located in bodies of water.

There have been a number of commercial offerings of Wi-Fi location systems targeted at indoor positioning. (See, e.g., Kavitha Muthukrishnan, Maria Lijding, Paul Havinga, Towards Smart Surroundings: Enabling Techniques and Technologies for Localization, Lecture Notes in Computer Science, Volume 3479, January 2 Hazas, M., Scott, J., Krumm, J.: Location-Aware Computing Comes of Age. IEEE Computer, 37(2):95-97, February 2004 005, Pa005, Pages 350-362.) These systems are designed to address asset and people tracking within a controlled environment like a corporate campus, a hospital facility or a shipping yard. The classic example is having a system that can monitor the exact location of the crash cart within the hospital so that when there is a cardiac arrest the hospital staff doesn't waste time locating the device. The accuracy requirements for these use cases are very demanding typically calling for 1-3 meter accuracy. These systems use a variety of techniques to fine tune their accuracy including conducting detailed site surveys of every square foot of the campus to measure radio signal propagation. They also require a constant network connection so that the access point and the client radio can exchange synchronization information similar to how A-GPS works. While these systems are becoming more reliable for these indoor use cases, they are ineffective in any wide-area deployment. It is impossible to conduct the kind of detailed site survey required across an entire city and there is no way to rely on a constant communication channel with 802.11 access points across an entire metropolitan area to the extent required by these systems. Most importantly outdoor radio propagation is fundamentally different than indoor radio propagation rendering these indoor positioning algorithms almost useless in a wide-area scenario.

There are numerous 802.11 location scanning clients available that record the presence of 802.11 signals along with a GPS location reading. These software applications are operated manually and produce a log file of the readings.

Examples of these applications are Netstumber, Kismet and Wi-FiFoFum. Some hobbyists use these applications to mark the locations of 802.11 access point signals they detect and share them with each other. The management of this data and the sharing of the information is all done manually. These application do not perform any calculation as to the physical location of the access point, they merely mark the location from which the access point was detected.

| Performance and reliability | Performance | Reliability |
| --- | --- | --- |
| Local Search/Advertising | <100 meters | 85% of the time |
| E911 | <150 meters | 95% of the time |
| Turn-by-turn driving directions | 10-20 meters | 95% of the time |
| Gaming | <50 meters | 90% of the time |
| Friend finders | <500 meters | 80% of the time |
| Fleet management | <10 meters | 95% of the time |
| Indoor asset tracking | <3 meters | 95% of the time |

SUMMARY

In general, in one aspect, the invention features a system that includes computer-implemented logic to derive position information for each of a plurality of Wi-Fi access points in a geographic area having a radius on the order of miles, wherein the position information is derived at least in part from sets of data collected during a comprehensive traversal of the geographic area, each set of data including signal data characterizing one or more observed characteristics of a signal received from the Wi-Fi access point, and location data characterizing a location at which the one or more characteristics of the signal received from the Wi-Fi access point was observed; and computer-implemented logic to store the derived position information in a non-transitory computer-readable medium.

Embodiments of this aspect of the invention may include one or more of the following features.

The one or more observed characteristics may include one or more radio characteristics of the signal received from the Wi-Fi access point. The geographical area may have a radius on the order of at least tens of miles. The computer-implemented logic to store the derived position information may include logic to store the derived position information for a particular Wi-Fi access point in association with data representative of an identifier of that Wi-Fi access point. The comprehensive traversal of the geographic area may include an exhaustive and/or systematic traversal of accessible thoroughfares of the geographic area. The computer-implemented logic to derive the position information may include logic to derive position information from a combination of newly-collected sets of data and previously-collected sets of data.

The system may further include computer-implemented logic to identify sets of data with potential error. The computer-implemented logic to derive the position information may include logic to exclude the identified sets of data with potential error from the sets of data from which the position information is derived. The system may further include computer-implemented logic to identify a portion of the geographic area in which the identified sets of data with potential error was collected. The system may further include computer-implemented logic to identify, as a group, sets of data that share a common identifier of a Wi-Fi access point; and perform clustering analysis of the sets of data of the identified group, and based on results of the analysis, designate one or more sets of data of the identified group as sets of data with potential error. The logic to perform clustering analysis may include logic to determine a first centroid for the Wi-Fi access point based at least in part on the sets of data of the identified group; and designate a first set of data as a set of data with potential error if a comparison of a distance between the first centroid and the location data of the first set of data exceeds a threshold. The logic to perform clustering analysis may include logic to determine a weighted centroid for the Wi-Fi access point based at least in part on the age of the location data of the sets of data of the identified group; and designate a first set of data as a set of data with potential error if a comparison of a distance between the weighted centroid and the location data of the first set of data exceeds a threshold.

The system may further include a collection of information in the non-transitory computer-readable medium, the collection of information describing the plurality of Wi-Fi access points in the geographic area. The plurality of Wi-Fi access points in the geographic area may include substantially all of the Wi-Fi access points in the geographic area.

The sets of data that share a common identifier of a Wi-Fi access point may provide reference symmetry when the position information for the Wi-Fi access point is derived.

The sets of data that share a common identifier of a Wi-Fi access point may reduce arterial bias when the position information for the Wi-Fi access point is derived.

The system may further include computer-implemented logic to identify at least one portion of the geographic area in which no position information for a Wi-Fi access point is derived.

In general, in another aspect, the invention features a computer-implemented method that includes deriving position information for each of a plurality of Wi-Fi access points in a geographic area having a radius on the order of miles, wherein the position information is derived at least in part from sets of data collected during a comprehensive traversal of the geographic area, each set of data including signal data characterizing one or more observed characteristics of a signal received from the Wi-Fi access point, and location data characterizing a location at which the one or more characteristics of the signal received from the Wi-Fi access point was observed; and storing the derived position information in a non-transitory computer-readable medium.

Embodiments of this aspect of the invention may include one or more of the following features.

The one or more observed characteristics may include one or more radio characteristics of the signal received from the Wi-Fi access point. The geographical area may have a radius on the order of at least tens of miles. The method of storing the derived position information may include storing the derived position information for a particular Wi-Fi access point in association with data representative of an identifier of that Wi-Fi access point. The comprehensive traversal of the geographic area may include an exhaustive and/or systematic traversal of accessible thoroughfares of the geographic area.

The method of deriving the position information may include deriving position information from a combination of newly-collected sets of data and previously-collected sets of data. The method may further include identifying sets of data with potential error. The method of deriving the position information may include excluding the identified sets of data with potential error from the sets of data from which the position information is derived. The method may further include identifying a portion of the geographic area in which the identified sets of data with potential error was collected. The method may further include identifying, as a group, sets of data that share a common identifier of a Wi-Fi access point; and performing clustering analysis of the sets of data of the identified group, and based on results of the analysis, designating one or more sets of data of the identified group as sets of data with potential error. The method of performing clustering analysis may include determining a first centroid for the Wi-Fi access point based at least in part on the sets of data of the identified group; and designating a first set of data as a set of data with potential error if a comparison of a distance between the first centroid and the location data of the first set of data exceeds a threshold. The method of performing clustering analysis may include determining a weighted centroid for the Wi-Fi access point based at least in part on the age of the location data of the sets of data of the identified group; and designating a first set of data as a set of data with potential error if a comparison of a distance between the weighted centroid and the location data of the first set of data exceeds a threshold. The sets of data that share a common identifier of a Wi-Fi access point may provide reference symmetry when deriving the position information for the Wi-Fi access point. The sets of data that share a common identifier of a Wi-Fi access point may reduce arterial bias when deriving the position information for the Wi-Fi access point. The method may further include identifying at least one portion of the geographic area in which no position information for a Wi-Fi access point is derived.

In general, in another aspect, the invention features software, embodied in a non-transitory computer-readable medium, including instructions executable by a processor to derive position information for each of a plurality of Wi-Fi access points in a geographic area having a radius on the order of miles, wherein the position information is derived at least in part from sets of data collected during a comprehensive traversal of the geographic area, each set of data including signal data characterizing one or more observed characteristics of a signal received from the Wi-Fi access point, and location data characterizing a location at which the one or more characteristics of the signal received from the Wi-Fi access point was observed; and store the derived position information in a non-transitory computer-readable medium.

Embodiments of this aspect of the invention may include one or more of the following features.

The one or more observed characteristics may include one or more radio characteristics of the signal received from the Wi-Fi access point. The geographical area may have a radius on the order of at least tens of miles. The instructions executable by the data processor to derive the position information may include instructions to derive position information from a combination of newly-collected sets of data and previously-collected sets of data. The instructions executable by the data processor to derive the position information may include instructions to excludes sets of data with potential error from the sets of data from which the position information is derived. The software may further include instructions executable by the data processor to identify, as a group, sets of data that share a common identifier of a Wi-Fi access point; and perform clustering analysis of the sets of data of the identified group, and based on results of the analysis, designate one or more sets of data of the identified group as sets of data with potential error. The instructions to perform clustering analysis may include instructions executable by the data processor to determine a first centroid for the Wi-Fi access point based at least in part on the sets of data of the identified group; and designate a first set of data as a set of data with potential error if a comparison of a distance between the first centroid and the location data of the first set of data exceeds a threshold. The instructions to perform clustering analysis may include instructions executable by the data processor to determine a weighted centroid for the Wi-Fi access point based at least in part on the age of the location data of the sets of data of the identified group; and designate a first set of data as a set of data with potential error if a comparison of a distance between the weighted centroid and the location data of the first set of data exceeds a threshold.

Other features and advantages of the invention are apparent from the following description, and from the claims.

DESCRIPTION OF DRAWINGS

In the drawings,

FIG. 8 depicts a central network server including a central database of Wi-Fi access points according to certain embodiments of the invention;

FIG. 9 depicts an exemplary architecture of positioning software according to certain embodiments of the invention;

FIG. 10 depicts an exemplary architecture of a scanning client according to certain embodiments of the invention; and FIG. 11 compares and contrasts the effects of a random scanning model with one using a model from the Chinese postman routing algorithm.

DESCRIPTION

Preferred embodiments of the present invention provide a system and a methodology for gathering reference location data to enable a commercial positioning system using public and private 802.11 access points. Preferably, the data is gathered in a programmatic way to fully explore and cover the streets of a target region. The programmatic approach identifies as many Wi-Fi access points as possible. By gathering location information about more access points, preferred embodiments not only provide a larger collection of location information about access points, but the location information for each access point may be calculated with more precision. Subsequently this larger set of more precise data may be used by location services to more precisely locate a user device utilizing preferred embodiments of the invention. Certain embodiments use techniques to avoid erroneous data in determining the Wi-Fi positions and use newly-discovered position information to improve the quality of previously gathered and determined position information. Certain embodiments use location-determination algorithms based on the context of the user device at the time the user requests a location. For example, the location-determination algorithm will be based on the number of Wi-Fi access points identified or detected when a location request is made, or based on the application making the request.

Figure 1:
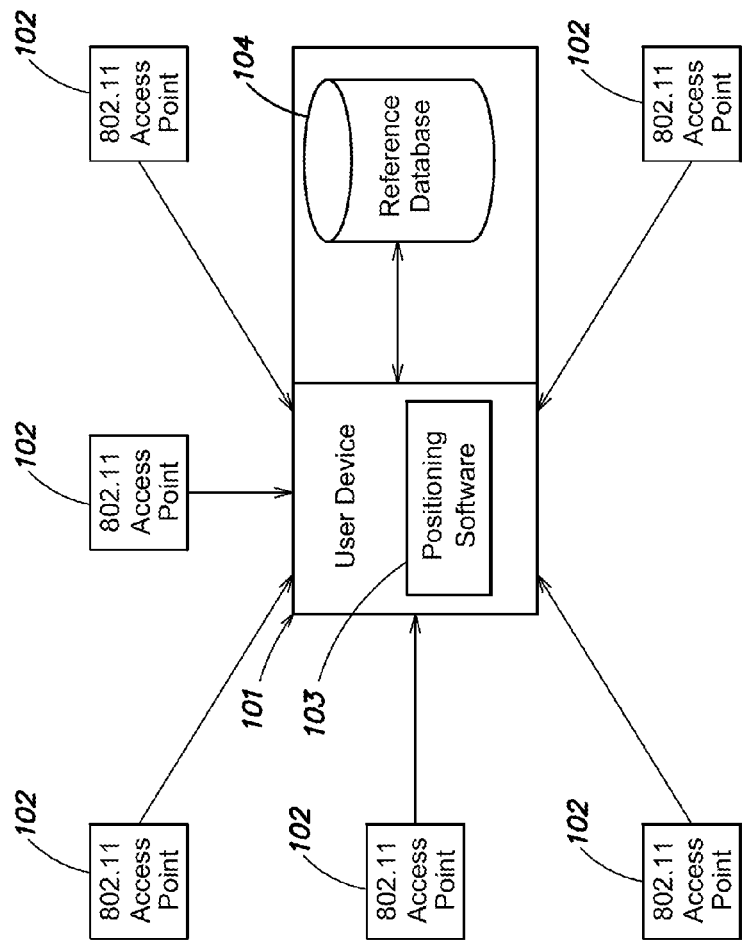
FIG. 1 depicts certain embodiments of a Wi-Fi positioning system.

FIG. 1 depicts a portion of a preferred embodiment of a Wi-Fi positioning system (WPS). The positioning system includes positioning software [103] that resides on a computing device [101]. Throughout a particular coverage area there are fixed wireless access points [102] that broadcast information using control/common channel broadcast signals. The client device monitors the broadcast signal or requests its transmission via a probe request. Each access point contains a unique hardware identifier known as a MAC address. The client positioning software receives signal beacons from the 802.11 access points in range and calculates the geographic location of the computing device using characteristics from the signal beacons. Those characteristics include the unique identifier of the 802.11 access point, known as the MAC address, and the strengths of the signal reaching the client device. The client software compares the observed 802.11 access points with those in its reference database [104] of access points, which may or may not reside on the device as well. The reference database contains the calculated geographic locations or power profile of all the access points the gathering system has collected. The power profile is a collection of readings that represent the power of the signal from various locations. Using these known locations, the client software calculates the relative position of the user device [101] and determines its geographic coordinates in the form of latitude and longitude readings. Those readings are then fed to location-based applications such as friend finders, local search web sites, fleet management systems and E911 services.

The positioning software is described in greater detail with reference to FIG. 9, which depict exemplary components of positioning software 103. Typically there is an application or service [901] that utilizes location readings to provide some value to an end user (example, driving directions). This location application makes a request of the positioning software for the location of the device at that particular moment. That request initiates the scanner [902], which makes a "scan request" to the 802.11 radio [903] on the device. The 802.11 radio sends out a probe request to all 802.11 access points [904] within range. According to the 802.11 protocol, those access points in receipt of a probe request will transmit a broadcast beacon containing information about the access point. That beacon includes the MAC address of the device, the network name, the precise version of the protocol that it supports and its security configuration along with information about how to connect to the device. The 802.11 radio collects this information from each access point that responds, calculates the signal strength of each access point and sends that back to the scanner.

The scanner passes this array of access points to the Locator [906] which checks the MAC addresses of each observed access point against the Access Point Reference Database [905]. This database can either be located on the device or remotely over a network connection. The Access Point Reference Database returns the location data for each of the observed access points that are known to the system. The Locator passes this collection of location information along with the signal characteristics returned from each access point to the Bad Data Filter [907]. This filter applies a number of comparison tests against each access point to determine if any of the access points have moved since they were added to the access point database. After removing bad data records, the Filter sends the remaining access points to the Location Calculation component [908]. Using the reference data from the access point database and the signal strength readings from the Scanner, the Location Calculation component computes the location of the device at that moment. Before that location data is sent back to the Locator, it is processed by the Smoothing engine [909] which averages a past series of location readings to remove any erratic readings from the previous calculation. The adjusted location data is then sent back to the Locator.

The calculated location readings produced by the Locator are communicated to these location-based applications [901] through the Application Interface [910] which includes an application programming interface (API) or via a virtual GPS capability [911]. GPS receivers communicate their location readings using proprietary messages or using the location standard like the one developed by the National Marine Electronics Association (NMEA). Connecting into the device using a standard interface such as a COM port on the machine retrieves the messages. Certain embodiments of the invention include a virtual GPS capability that allows any GPS compatible application to communicate with this new positioning system without have to alter the communication model or messages.

The location calculations are produced using a series of positioning algorithms intended to turn noisy data flows into reliable and steady location readings. The client software compares the list of observed access points along with their calculated signal strengths to weight the location of user to determine precise location of the device user. A variety of techniques are employed including simple signal strength weighted average models, nearest neighbor models combined with triangulation techniques and adaptive smoothing based on device velocity. Different algorithms perform better under different scenarios and tend to be used together in hybrid deployments to product the most accurate final readings. Preferred embodiments of the invention can use a number of positioning algorithms. The decision of which algorithm to use is driven by the number of access points observed and the user case application using it. The filtering models differ from traditional positioning systems since traditional systems rely on known reference points that never move. In the model of preferred embodiments, this assumption of fixed locations of access points is not made; the access points are not owned by the positioning system so they may move or be taken offline. The filtering techniques assume that some access points may no longer be located in the same place and could cause a bad location calculation. So the filtering algorithms attempt to isolate the access points that have moved since their position was recorded. The filters are dynamic and change based on the number of access points observed at that moment. The smoothing algorithms include simple position averaging as well as advanced bayesian logic including Kalman filters. The velocity algorithms calculate device speed by estimating the Doppler effect from the signal strength observations of each access point.

Gathering of Scan Data to Build Reference Database

Figure 2:
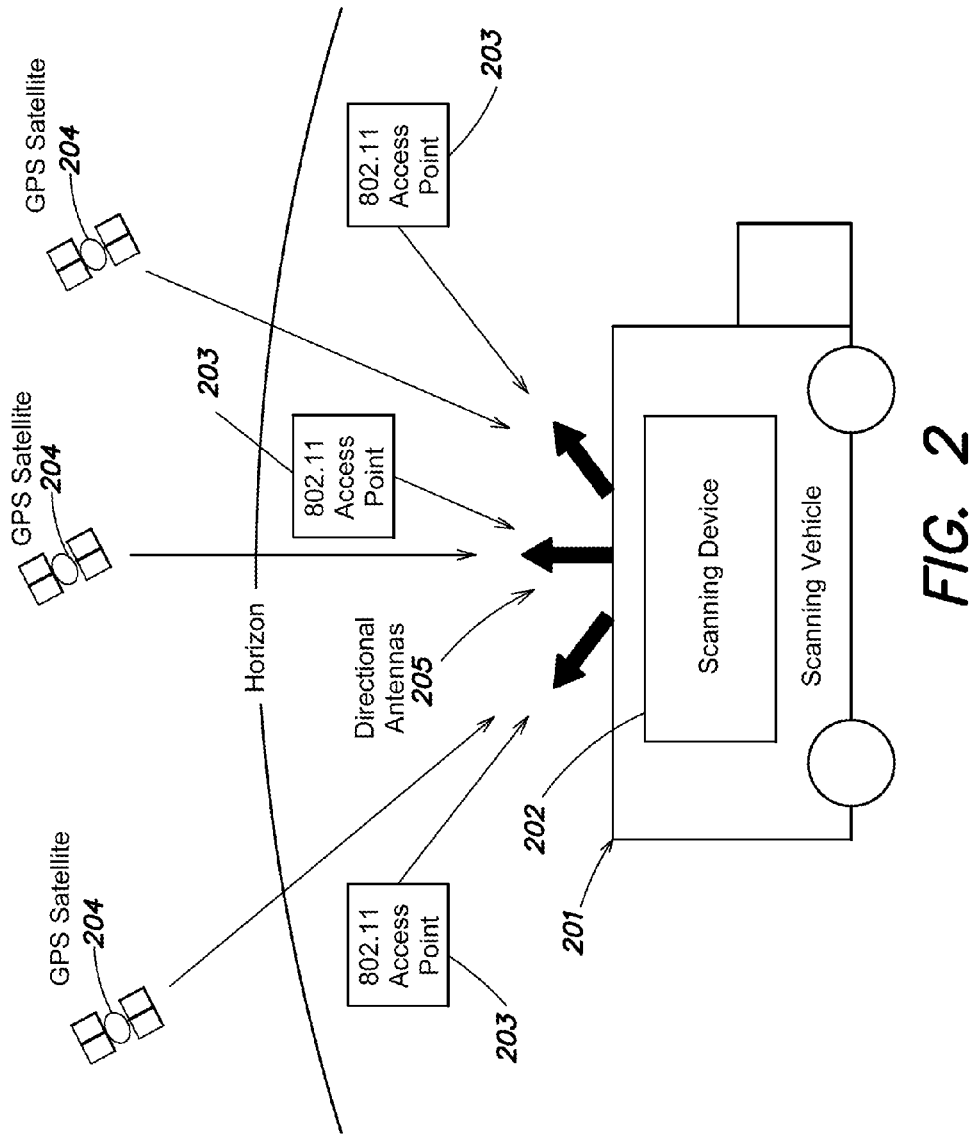
FIG. 2 depicts scanning vehicles including scanning devices according to certain embodiments of the invention.
Figure 3:
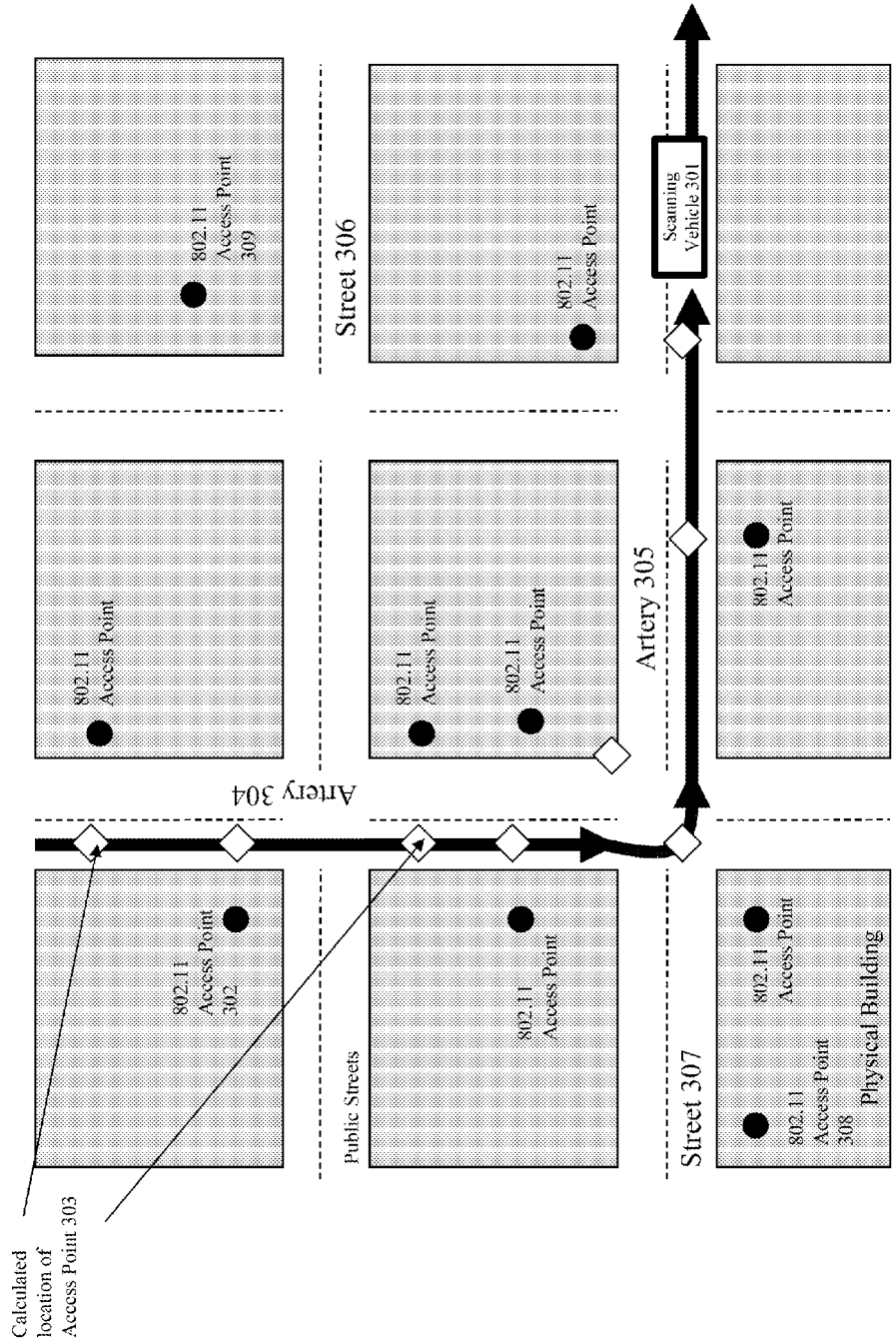
FIG. 3 depicts an example of a scanning scenario to illustrate the problem of arterial bias in data collection.

FIG. 2 depicts the components used to gather location information for the various access points. A large fleet of vehicles [201] is deployed to build the reference database (104 of FIG. 1) for the positioning system. These vehicles 201 follow a programmatic route through target scan areas to gather data in the most optimal fashion producing the highest quality data. The target scan areas typically represent a large metropolitan area including every single drivable street in 15-20 mile radius. These vehicles are equipped with scanning devices [202] designed to record the locations and characteristics of 802.11 signals while traversing the coverage area. The scanning devices track the location of the scanning vehicle every second using signal from GPS satellites [204]. The scanning device also tracks the presence of any 802.11 access point within range and records the radio characteristics of that access point signal along with the GPS location of the scanning vehicle. The quality of the data collected is greatly affected by the scanning methodology employed by the scanning vehicles. Each model has its own benefits and limitations. One approach, known as the Random Model, places scanning devices in vehicles as they are conducting daily activities for business or personal use. These vehicles could be delivery trucks, taxi cabs, traveling salesman or just hobbyists. The concept is that over time these vehicles will cover enough streets in their own random fashion in order to build a reliable reference database. The model does in fact provide a simple means to collect data but the quality of the resulting data is negatively affected due to issues of "arterial bias". FIG. 3 describes the challenge of the random model. When scanning vehicles traverse routes designed to solve other problems than gathering data (e.g. delivering packages, people commuting to and from work) they tend to follow destination routes. A destination route is when a driver needs to get from A to B and seeks the fastest route to get there. So the driver looks for the shortest route to the nearest main artery whether it be a highway or a main thoroughfare. As a result, over time the random driving covers more and more ground by the cumulative coverage shows a bias to the main roads, or arteries at the expense of the smaller and surrounding roads. In FIG. 3, arteries [304] and [305] are heavily traversed by the scanning vehicles resulting in a healthy amount of scanning data for those streets. But streets [306] and [307] are rarely, if ever, covered because there is no frequent destination on those streets and the arteries are more optimal travel roads. The result is that access points [308] and [309] are not scanned at all by the scanning vehicles so the positioning system will struggle to identify a user who is traveling on streets [306] and [307]. The result is that when the system attempts to calculate the location of the access point from the scan data it is limited to a biased collection of input data. FIG. 11 shows the difference in resulting data quality. As the scanning vehicle drives near the Access Point [1101], it records a reading and its location continuously. The positioning system must then calculate the location of the Access Point [1102] using the entire set of observed data [1103]. In the Random Scanning model the set of data is limited to one main road passing by the access point. That forces the system to calculate the access point's location near that road rather than close to the access point itself.

Figure 4:
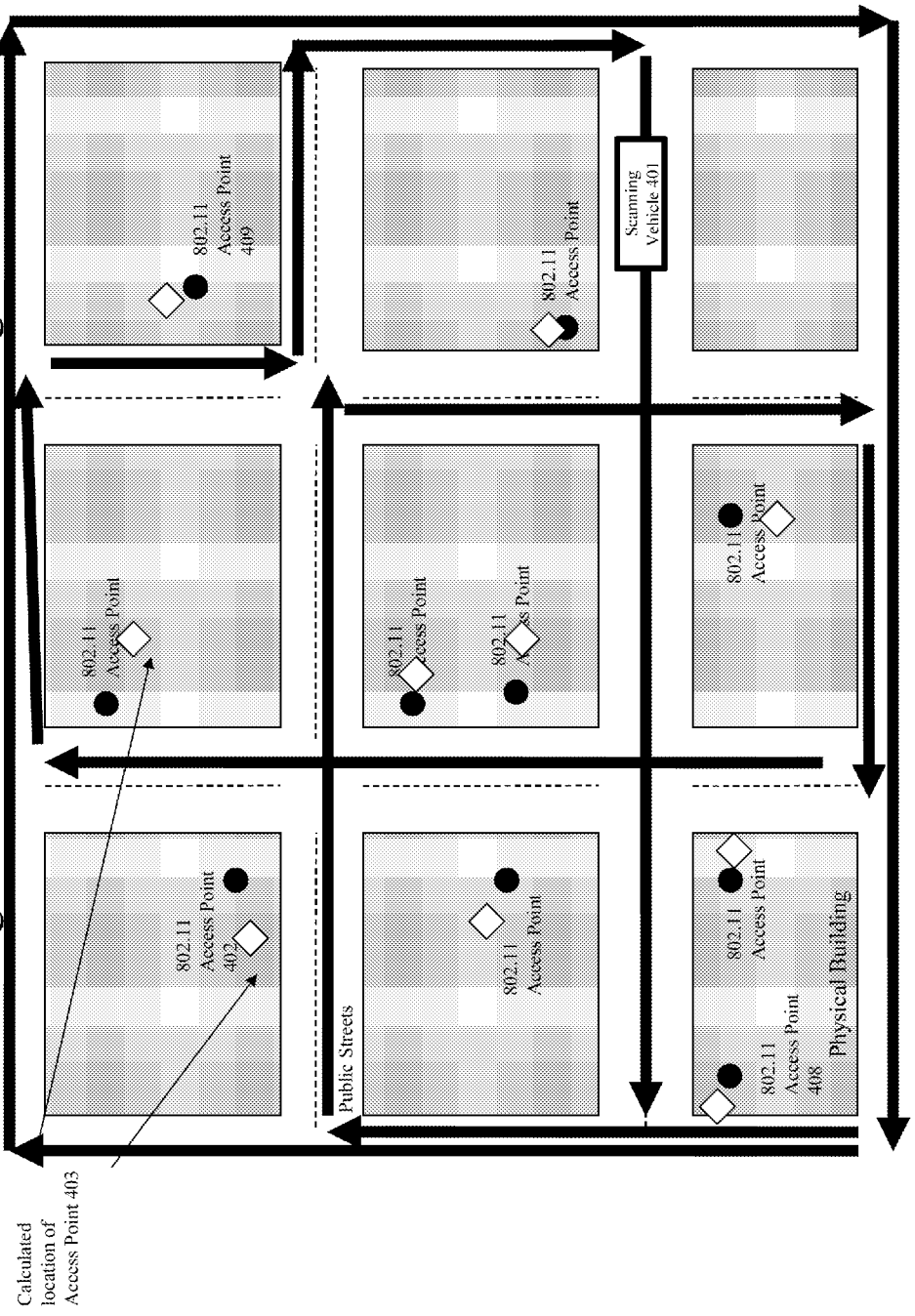
FIG. 4 depicts an example using a programmatic route for a scanning vehicle according to certain embodiments of the invention.

Another approach is develop routing algorithms that include every single street in the target area so as to avoid arterial bias in the resulting collection of data thus producing a more reliable positioning system for the end users. FIG. 4 describes an optimized routing algorithm known as the Chinese Postman to calculate the most efficient driving route for covering every single street in a target area. The Chinese Postman routing algorithm is a known technique used by postal agencies, utilities and census agencies and is a variant of the Eulerian cycle problem. The Eulerian cycle is a problem asking for the shortest tour of a graph which visits each edge at least once. (See, e.g., Kwan, M. K. "Graphic Programming Using Odd or Even Points." Chinese Math. 1, 273-277, 1962.) Preferred embodiments of the invention include a methodology for identifying a target region for coverage and then using the Chinese Postman routing algorithm for planning the vehicle route. The scanning vehicle [401] follows the optimal route according to the algorithm showing no bias to any street ensuring that all observable access points are detected and mapped by the system. So, by way of example, access points [408] and [409] are added to the access point database using the Chinese Postman model but would have been missed using the Random model. Referring back to FIG. 11, with the Chinese Postman Scanning model, the vehicle travels every single road getting as complete a set of scanning records [1106] for the Access Point [1104]. The system can then calculate the location [1105] of the access point with less error since it has a more uniform distribution of scan data for access point 1104 than for access 1102. So the Chinese Postman Scanning model not only gathers more access points uniformly across a target area but the resulting data produces more accurate calculations of access point locations.

Higher Quality AP Locations

Once collected (or partially collected), the scanning data is uploaded back to a central access point database (described later in this application) where it is processed. The raw observation points for each access point are used to reverse triangulate the actual physical location of the access points or create a power profile representing the radio propagation of that access point. In order to produce the most accurate calculated location for a particular access points or to create the most accurate power profile, the scanning vehicle must observe the access point from as many different angles as possible. In the random model [FIG. 3], many access points are observed from only one street forcing the system to calculate their location directly on the street [303]. These locations exhibit a directional bias and are significantly different than the actual locations of these access points [302]. Errors are introduced into a positioning system when its reference point locations are inaccurate. So in this positioning system, the accuracy of the access point locations play a large role in the accuracy of the end user positioning accuracy. Using the Chinese Postman model [FIG. 4] the scanning vehicles detect a particular access point from as many sides as possible of the building housing the access point. This additional data greatly improves the results of the reverse triangulation formula used to calculate the location of the access points [403]. More details on the access point location quality is described in connection with FIG. 11.

The scanning data collected from this system represents a reliable proxy for the signal propagation pattern for each access point in its specific environment. Every radio device and associated surrounding environment produces a unique signal fingerprint showing how far the signal reaches and how strong the signal is in various locations within the signal fingerprint. This fingerprint data is used in conjunction with the calculated access point location to drive high accuracy for the positioning system. This fingerprint is also known as a "power profile" since the signal strengths at each position is measured as signal power in watts. The positioning system can interpret the fingerprint data to indicate that a particular signal strength of an 802.11 access point radio is associated with a particular distance from that access point. Signal fingerprinting techniques are used in indoor Wi-Fi positioning but have proved difficult to replicate in the wider area outdoor environments because the difficulty associated with collecting the fingerprint data. When the fingerprints or power profiles of multiple access points are overlaid, the positioning system can determine a device location merely by finding the one position where the observed signal strengths match the combined fingerprints. Preferred embodiments of this invention provide a reliable system for obtaining this fingerprint data across a massive coverage area with millions of access points in order to utilize fingerprint-based positioning algorithms.

Reference Symmetry

Figure 5:
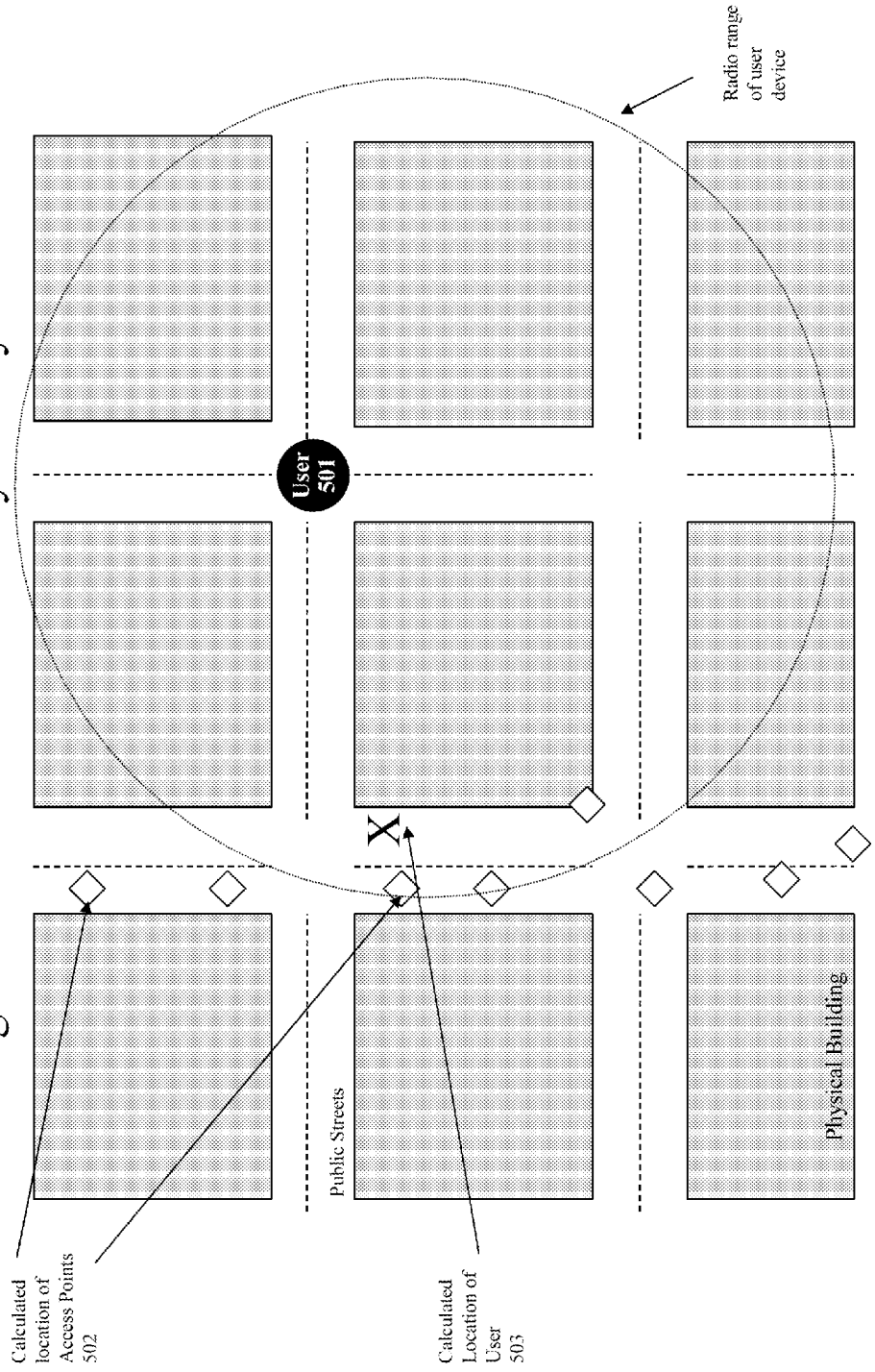
FIG. 5 depicts an example scenario to illustrate the problem of lack of reference symmetry of Wi-Fi access points in locating a user device.
Figure 6:
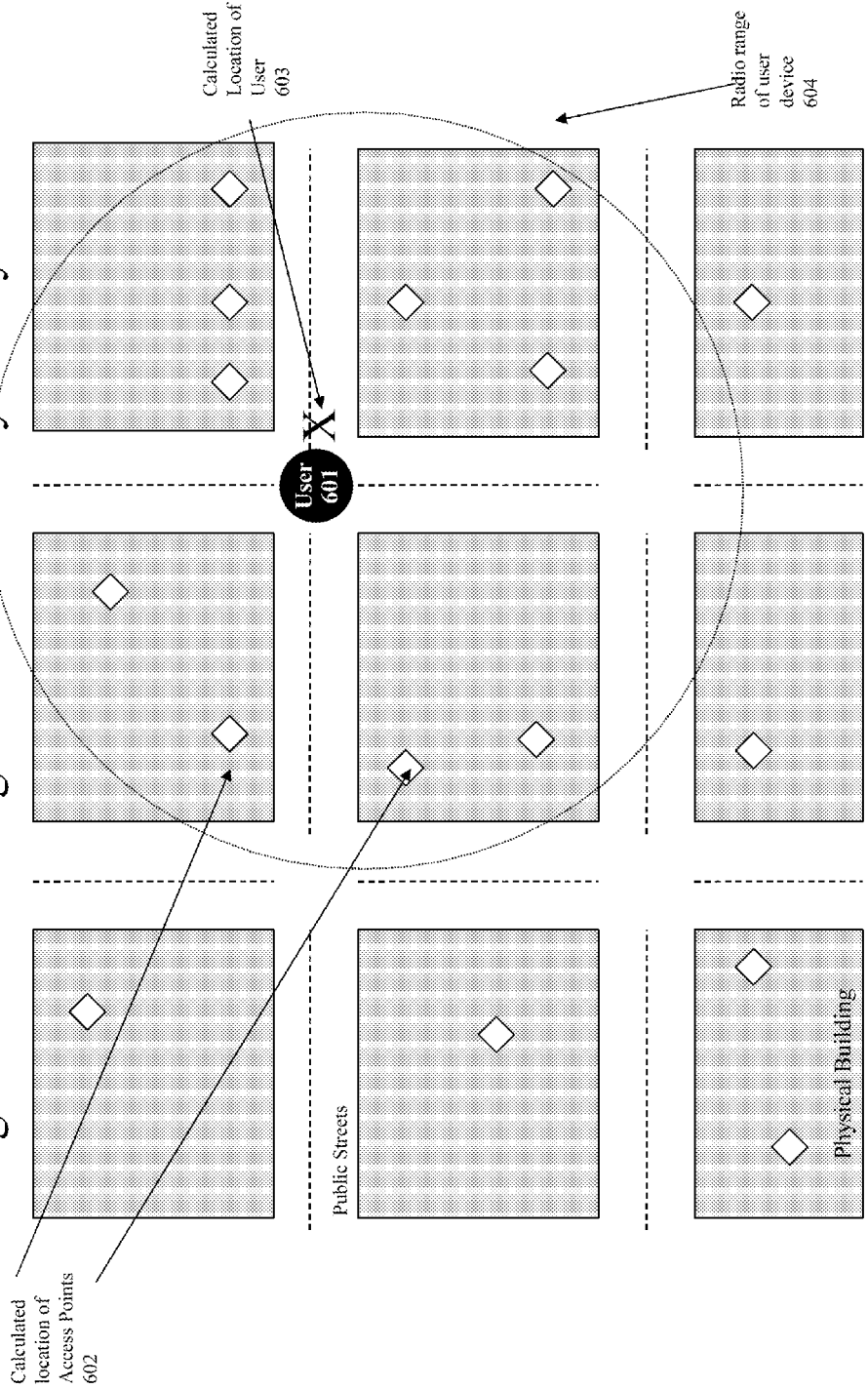
FIG. 6 depicts an example scenario to illustrate reference symmetry of Wi-Fi access points in locating a user device.

Positioning systems typically work by having three or more reference points around the device being tracked. These positioning systems use the radio signals from these reference points in various ways to calculate the device's current location. Significant errors occur when there are an insufficient number of reference points or when the reference points lack balance or symmetry around the user. As illustrated in FIG. 5, the arterial bias that emerges from the random model introduces many scenarios where the end user [501] moves into physical areas in which there are only recorded access point locations [502] on one side of them. This lack of symmetry in the distribution of reference points around the end user causes the positioning algorithms to calculate the device location [503] with a great deal of error. With Chinese Postman model of scanning for access points, the user typically encounters a physical location [FIG. 6] in which there are numerous access point locations [602] on all sides of the user [601] within the range [604] of the device's 802.11 radio. The resulting position calculation [603] has reduced location bias and is more accurate as a result. FIG. 11 is another example showing the impact of quality location calculations.

Scanning Device

Figure 7:
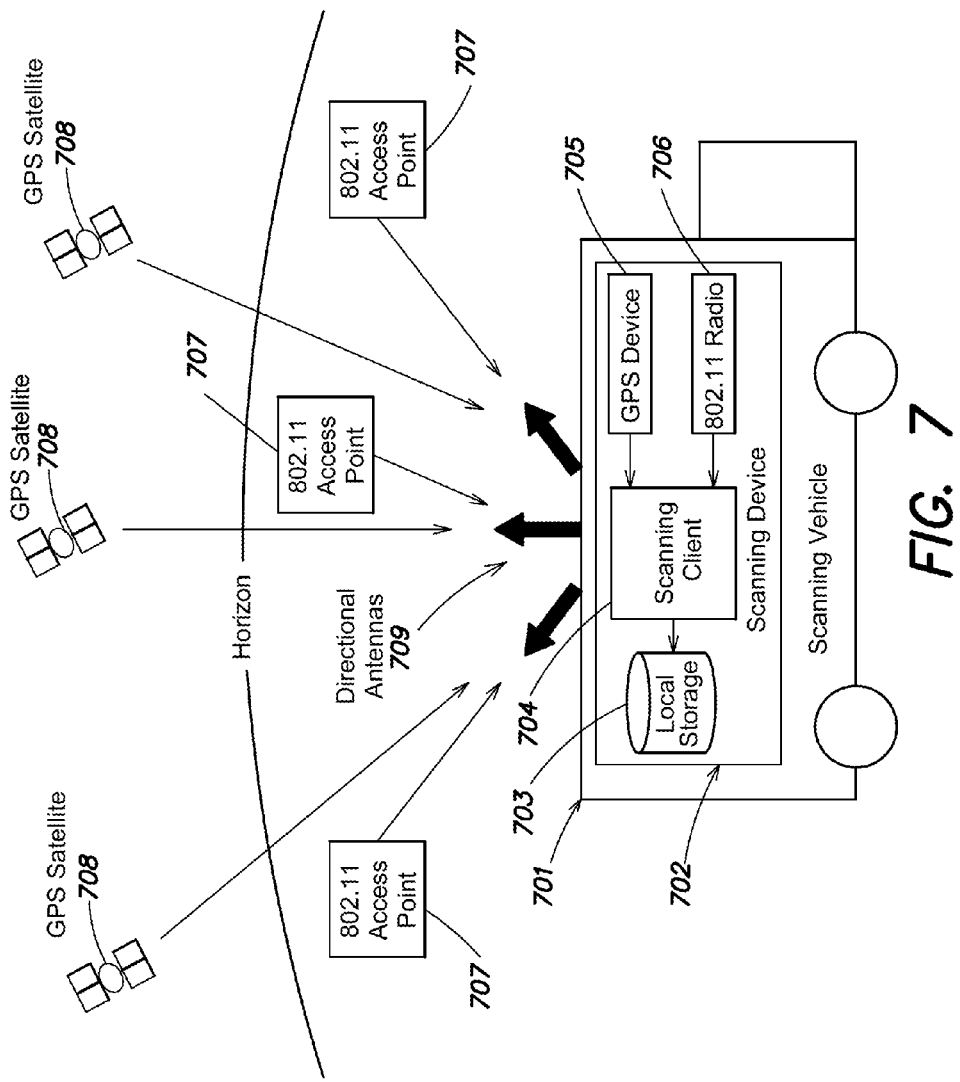
FIG. 7 depicts scanning vehicles including scanning devices according to certain embodiments of the invention.

FIG. 7 depicts the details of a preferred embodiment of a scanning device 702 used to detect and identify the various Wi-Fi access points. A scanning vehicle [701] contains a scanning device [702] that continuously scans the airways for radio signals from GPS satellites [708] and 802.11 access points [707]. The scanning device runs the scanning client software [704] that controls the entire process. The scanning client activates both the GPS receiver [705] and the 802.11 radio [706]. The GPS receiver is set into a continuous reception mode calculating the geographic location of the device every second. That calculation is read by the scanning client and stored in the local data storage [703]. The scanning client initiates the 802.11 radio and begins sending out 802.11 probe requests using directional antennas [709]. Any 802.11 access point [707] within range of that probe request responds with a signal beacon as per the 802.11 protocol. The responding signal beacons contains the network name of the access point (known as an SSID), the MAC address of the access point device as well as other meta information about the access point. The responding signals reach each of the directional antennas with a different strength of signal based on the vector of origin and the proximity of the access point. That vector is recorded along with the identifier of that particular antenna and the meta information about the access point. This probe-receive-record process occurs continuously every tenth of a second.

The scanning device deployed is a combination of the iPAQ 4155 Pocket PC and Powered GPS PDA Mount Cradle with integrated SiRF II type GPS receiver with XTrac v. 2.0 firmware.

The Scanning Client 704 of certain embodiments is described in connection with FIG. 10. The client consist of three main components, the Data Manager [1001], the System Manager [1002] and the Upload Manager [1003]. The Data Manager [1001] controls the operations of both the GPS radio [1006] and the 802.11 radio [1007]. The Data Manager controls when and how often these radios scan for signals and process those signals. The GPS radio once activated receives signals from GPS satellites [1004] and calculates its geographic location. The GPS recorder [1008] logs all of those readings every second and sends them to the File Manager [1010]. The Wi-Fi Recorder [1009] activates the 802.11 Radio to scan every tenth of a second, and associates those 802.11 readings with the GPS readings coming from the GPS radio and sends the resulting data to the File Manager. The File Manager receives scan data from both the GPS Recorder and Wi-Fi Recorder and creates storage files on the device. This process continues the entire time the device is operational and both radios are functioning In the Upload Manager [1003] there is a Hotspot Detector [1017] that monitors the 802.11 scanning results to look for the configured network of public hotspots [1024] (e.g. T-mobile) that the device is authorized to access. Once it detects a valid Hotspot it notifies the user of its presence. The user can select to connect to the hotspot by activating the Create Connection component [1018]. This component associates with the hotspot's access point and creates an 802.11 connection. Then the Hotspot Authentication module [1019] supplies valid authentication information for the device. The hotspot validates the account and then provides network access to the device. The Upload Manager then initiates the Upload Server Authentication process [1020] to connect to the Central Network Server [1025] and provides valid authentication information. Once authenticated, the Upload & Data Verification module [1021] is initiated. This module retrieves the scan data from the Scanning Data store [1011] and uploads the data to the Central Network Server using FTP. The Central Network Server initiates a process to store all the data in the Central Access Point Database. After the upload is complete the upload process moves the scan data from the Scanning Data store [1011] to the Backup Data store [1012] on the device. Once the upload is completed and verified, the New Version module [1022] checks the Central Network Server to determine if there is a new version of the client software available for the device. If there is a new version, the software is downloaded and the New Version Installation [1023] process begins to upgrade the client software. Once the installation process is completed the connection with the Central Network Server is terminated, the connection with the hotspot is terminated and the device returns to normal scanning operation.

Included in the Scanning Client 704 are a set of utilities that help to manage the device and reduce system errors. The Radio Manager [1013] monitors the operation of the GPS Radio and the Wi-Fi Radio to make sure they are functioning properly. If the Radio Manager encounters a problem with one of the radios, it will restart the radio. The User Interface Controller [1014] presents the tools and updates to the user so they can operate the device effectively. The Error Handling and Logging [1015] records all system issues to the device and alerts the user so they can address. The System Restart module [1016] is called when issues cannot be resolved. This module shuts down the device and restarts the hardware, operating system and scanning client to ensure proper operation.

The III 0 of a second 802.11 scanning interval was chosen since it provides the optimal scanning period for 802.11 under these conditions using off the shelf hardware. 802.11b/g/n operates using 14 channels of the unlicensed spectrum. An individual access point broadcasts its signal beacon over one of those channels at any given time. The scanning device needs to survey each channel in order to observe as many access points as possible. The scanning interval is correlated with the average speed of the scanning vehicle to optimize how the scanning client covers the frequency real estate of a particular region.

Central Network Server

With reference to FIG. 8, the fleet of vehicles perform their scanning routines while driving their pre-designed routes. Periodically each vehicle [801] will connect to an available 802.11 access point and authenticate with the Data Communications Module [807] of the Central Network Server. Typically the access points used for communicating with the Central Network Server are public hotspots like those operated by T-Mobile ensuring reliable and metered access. The provisioning of this connection could be done via any available public access point. The scanning vehicle stops at a nearby hotspot location and begins the process of connecting to the access point. Once authenticated, the scanning client [704] identifies all the recently collected scan data from the local storage [703] and uploads that data to the Central Network Database [802].

Once the data has been uploaded to the database, the Parser and Filter process [803] begins. The Parser and Filter process reads all of the upload scanning data and loads it up into the appropriate tables of the database. During this exercise the data is evaluated for quality issues. In some cases the GPS receiver may record erroneous or error records for some period of time, which could negatively affect the final access point location calculation. The parser and filter process identifies these bad records and either corrects them or removes them from the system. The filtering process users clustering techniques to weed out error prone GPS readings. For example, if 90% of the readings are within 200 meters of each other but the remaining 10% of the readings are 5 kilometers away then those outliers are removed by the filter and stored in a corrupted table of the database for further analysis. In particular, the system first calculates the weighted centroid for the access point using all reported data. It then determines the standard deviation based on the distribution of the reported locations. The system uses a definable threshold based on the sigma of this distribution to filter out access points that are in error. Once these error records are marked, the centroid is recalculated with the remaining location records to determine the final centroid using the Reverse Triangulation method described below.

Note that the error records may be the result of an access point that has moved. In this instance, the centroid for the access points will quickly "snap" to the new location based on the preponderance of records. An additional enhancement to the algorithm would include a weighting value based on the age of the records such that new records represent a more significant indication of the present location for a given access point.

Once the parsing process has been completed the central network system initiates the Reverse Triangulation model [804] begins processing the new data. During this process 1) new access points are added to the database and their physical location is calculated and 2) existing access points are repositioned based on any new data recorded by the scanners. The reverse triangulation algorithm factors in the number of records and their associated signal strengths to weight stronger signal readings more than weaker signals with a quasi weighted average model.

During data gathering, a WPS user is equipped with a Wi-Fi receiver device which measures Received Signal Strength (RSS) from all the available Wi-Fi access points, and then extracts location information of corresponding access points. RSS value of access points are shown as follows: {RSSI, RSS2, . . . RSSn}

If the corresponding recorded GPS location of access point i is denoted by $\{La_i, Long_i\}$, and the calculated access point location is denoted by $\{Lat_i, Long_i\}$ the triangulated position is found by applying the algorithm as follows:

$$Lat_u = \frac{\sum_{i=1}^n \sqrt[4]{10^{RSS_i/10}} \, Lat_i}{\sum_{i=1}^n \sqrt[4]{10^{RSS_i/10}}}$$

$$Long_u = \frac{\sum_{i=1}^n \sqrt[4]{10^{RSS_i/10}} \, Long_i}{\sum_{i=1}^n \sqrt[4]{10^{RSS_i/10}}}$$

The quad root of power is selected to ease the implementation of the algorithm, since quad root is synonymous to taking two square roots.

The second point is referring to adjusting the dynamic range of coefficients. If the dynamic range of coefficients is a concern, the coefficient of the algorithm can be divided by a constant number, e.g., $$Lat_u = \frac{\sum_{i=1}^n \frac{\sqrt[4]{10^{RSS_i/10}}}{C} Lat_i}{\sum_{i=1}^n \frac{\sqrt[4]{10^{RSS_i/10}}}{C}}$$

$$Long_u = \frac{\sum_{i=1}^n \frac{\sqrt[4]{10^{RSS_i/10}}}{C} Long_i}{\sum_{i=1}^n \frac{\sqrt[4]{10^{RSS_i/10}}}{C}}$$

The Parameter C can be any number and it does not impact the results, theoretically. Since, the weighted average is based on the ratio of the coefficients and not the absolute value, theoretically, dividing all the coefficients by a constant value, C, does not impact the results, but it changes the dynamic range of the coefficient values.

This final {Lat., Long.} is then used as the final centroid value for the location of that access point. The latitude and longitude will then be stored in the database including a timestamp to indicate the freshness of the triangulation calculation.

After the Central Network Database has been updated and each access point has been repositioned, the Data Pack Builder [805] creates subsets of the database based on regions of the country or world. The pack builder facilitates distribution of the database for a variety of use cases in which only region certain geographies are of interest. The pack builder is configured with region coordinates representing countries, time zones and metropolitan areas. Utilizing this technique a user can download just the location data for the west coast of the United States. The pack builder segments the data records and then compresses them.

The Fleet Management Module [806] helps operations personnel manage the scanning vehicles and ensure they are adhering the routing procedures. This module processes all the scan data and builds the location track for each vehicle in the system. The operations manager can create maps of the vehicle track using the Map Builder [808] to visually inspect the coverage for a particular region. The GPS tracking data from each device is reviewed with route mapping software to verify completion of coverage and to identify missed areas. This ability to audit and verify uniform coverage ensures that the system is getting the best data possible. The module also calculates the driving time of the vehicle to determine average speed and to subtract any idle time. These outputs are used to monitor efficiency of the overall system and in planning of future coverage.

It will be appreciated that the scope of the present invention is not limited to the above described embodiments, but rather is defined by the appended claims; and that these claims will encompass modifications of and improvements to what has been described.

What is claimed is:

1. A method comprising:
   receiving, at a server from one or more scanning devices, scanning data for Wi-Fi access points whose Wi-Fi signals were observed by the one or more scanning devices in a target area, wherein the one or more scanning devices each include a radio for observing the Wi-Fi signals;
   identifying groups of scanning data that share a common identifier of a Wi-Fi access point;
   for each group of scanning data, determining a centroid of the scanning data of the group, designating a set of scanning data of the group that exceeds a threshold distance from the centroid as having potential error, and calculating a location of the Wi-Fi access point by applying a reverse triangulation algorithm to the scanning data of the group that has not been designated as having potential error;
   storing the calculated location of the Wi-Fi access point for each group of scanning data in a reference database;
   receiving, by client software executing on a mobile device from an application or service on the mobile device that utilizes location readings, a request for a location of the mobile device;
   obtaining, by the client software, an identity of one or more Wi-Fi access points in range of the mobile device;

computing the location of the mobile device using calculated locations of the one or more Wi-Fi access points from the reference database; and returning, by the client software, the computed location of the mobile device to the application or service.

2. The method of claim 1, wherein the centroid is a weighted centroid determined from scanning data weighted based upon age, wherein newer scanning data is assigned a greater weight than older scanning data.

3. The method of claim 1, wherein each item of scanning data includes a location, and the designating the set of scanning data further comprises:
calculating a standard deviation of a distribution of locations of the group of scanning data; and
determining the threshold distance based upon the standard deviation.

4. The method of claim 1, further comprising:
removing the set of scanning data designated as having potential error.

5. The method of claim 1, further comprising:
marking the set of scanning data designated as having potential error; and
storing the marked scanning data in the reference database.

6. The method of claim 1, wherein the calculating the location of the Wi-Fi access point weights scanning data of the group that has not been designated as having potential error based on a number of observations of the Wi-Fi signals.

7. The method of claim 1, wherein the storing the calculated location of the Wi-Fi access point for each group of scanning data further comprises:
storing a timestamp in the reference database indicating freshness of the calculated location.

8. The method of claim 1, further comprising:
generating a subset of the reference database based upon geography;
downloading the subset to the mobile device; and
performing the receiving the request, the obtaining the identity, and the computing the location by the client software executing on the mobile device based on the subset.

9. The method of claim 1, wherein the target area is a geographic area having a radius of one or more miles, and the Wi-Fi signals were observed by the one or more scanning devices during a traversal of substantially all drivable streets within the geographic area.

10. A system comprising:
a central network server configured to receive scanning data for Wi-Fi access points whose Wi-Fi signals were observed in a target area, identify groups of scanning data that share a common identifier of a Wi-Fi access point, and for each group of scanning data, determine a centroid of the scanning data of the group, designate a set of scanning data of the group that exceeds a threshold distance from the centroid as having potential error, and calculate a location of the Wi-Fi access point by applying a reverse triangulation algorithm to the scanning data of the group that has not been designated as having potential error;
a reference database configured to store the calculated location of the Wi-Fi access point for each group of scanning data; and
a mobile device having client software configured to receive a request for a location of the mobile device from an application or service executing on the mobile device that utilizes location readings, identify one or more Wi-Fi access points in range of the mobile device, compute the location of the mobile device using calculated locations of the one or more Wi-Fi access points from the reference database, and return the computed location of the mobile device to the application or service.

11. The system of claim 10, wherein the centroid is a weighted centroid determined from scanning data weighted based upon age, wherein newer scanning data is assigned a greater weight than older scanning data.

12. A non-transitory computer-readable medium having instructions executable by one or more processors stored thereon, the instructions when executed by the one or more processors operable to:
process scanning data for Wi-Fi access points whose Wi-Fi signals were observed in a target area;
identify groups of scanning data that share a common identifier of a Wi-Fi access point;
for each group of scanning data, determine a centroid of the scanning data of the group, designate a set of scanning data of the group that exceeds a threshold distance from the centroid as having potential error, and calculate a location of the Wi-Fi access point by applying a reverse triangulation algorithm to the scanning data of the group that has not been designated as having potential error; and
store the calculated location of the Wi-Fi access point for each group of scanning data in a reference database of a central network server; and
distribute at least a portion of the reference database from the central network server to a mobile device that is usable by client software executing on the mobile device to compute the location of the mobile device using calculated locations from the at least the portion of reference database of one or more Wi-Fi access points that are in range of the mobile device to be returned to an application or service on the mobile device.

13. The non-transitory computer-readable medium of claim 12, wherein the centroid is a weighted centroid determined from scanning data weighted based upon age, wherein newer scanning data is assigned a greater weight than older scanning data.

14. The non-transitory computer-readable medium of claim 12, wherein each item of scanning data includes a location, and the instructions that when executed are operable to designate the set of scanning data are further operable to:
calculate a standard deviation of a distribution of locations of the group of scanning data; and
determine the threshold distance based upon the standard deviation.

15. The non-transitory computer-readable medium of claim 12, wherein the instructions when executed are further operable to:
remove the set of scanning data designated as having potential error.

16. The non-transitory computer-readable medium of claim 12, wherein the instructions when executed are further operable to:
mark the set of scanning data designated as having potential error; and
store the marked scanning data in the reference database.

17. The non-transitory computer-readable medium of claim 12, wherein the instructions that when executed are operable to calculate the location of the Wi-Fi access point are further operable to:

weight scanning data of the group that has not been designated as having potential error based on observed signal strength of the Wi-Fi signals.

18. The non-transitory computer-readable medium of claim 12, wherein the instructions that when executed are operable to calculate the location of the Wi-Fi access point are further operable to:

weight scanning data of the group that has not been designated as having potential error based on a number of observations of the Wi-Fi signals.

19. The non-transitory computer-readable medium of claim 12, wherein the instructions that when executed are operable to store the calculated location of the Wi-Fi access point for each group of scanning data are further operable to:

store a timestamp in the reference database indicating freshness of the calculated location.

20. The non-transitory computer-readable medium of claim 12, wherein the instructions when executed are further operable to:

receive a request for a location of the mobile device from the application or service on the mobile device that utilizes location readings;

obtain an identity of the one or more Wi-Fi access points in range of the mobile device; and in response to the request for the location of the mobile device, compute the location of the mobile device using the calculated locations of the one or more Wi-Fi access points from the reference database, and return the computed location of the mobile device to the application or service.

* * * * *